United States Patent
Solovyev et al.

(10) Patent No.: US 12,160,603 B2
(45) Date of Patent: Dec. 3, 2024

(54) VIDEO DECODER AND METHODS

(71) Applicant: HUAWEI TECHNOLOGIES CO., LTD., Guangdong (CN)

(72) Inventors: Timofey Mikhailovich Solovyev, Munich (DE); Roman Igorevich Chernyak, Moscow (RU); Alexander Alexandrovich Karabutov, Munich (DE); Jianle Chen, San Diego, CA (US); Sergey Yurievich Ikonin, Moscow (RU); Elena Alexandrovna Alshina, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/230,384

(22) Filed: Aug. 4, 2023

(65) Prior Publication Data

US 2024/0040146 A1    Feb. 1, 2024

Related U.S. Application Data

(63) Continuation of application No. 17/237,924, filed on Apr. 22, 2021, now Pat. No. 11,765,383, which is a
(Continued)

(51) Int. Cl.
*H04N 19/573* (2014.01)
*H04N 19/159* (2014.01)
(Continued)

(52) U.S. Cl.
CPC ......... *H04N 19/573* (2014.11); *H04N 19/159* (2014.11); *H04N 19/176* (2014.11); *H04N 19/577* (2014.11)

(58) Field of Classification Search
CPC .. H04N 19/159; H04N 19/176; H04N 19/577; H04N 19/573
See application file for complete search history.

(56) References Cited

U.S. PATENT DOCUMENTS

| | | | |
|---|---|---|---|
| 2005/0281334 A1 | 12/2005 | Walker et al. | |
| 2011/0200107 A1* | 8/2011 | Ryu | H04N 19/162 375/E7.125 |

(Continued)

FOREIGN PATENT DOCUMENTS

| | | |
|---|---|---|
| CN | 101610413 A | 12/2009 |
| CN | 102461150 A | 5/2012 |

(Continued)

OTHER PUBLICATIONS

Document: JVET-L0266-v2 , Li Zhang et al, CE4: History-based Motion Vector Prediction (Test 4.4.7), Joint Video Experts Team (JVET) of ITU-T SG 16 WP 3 and IS0/IEC JTC 1/SC 29/WG11, 12th Meeting: Macao, CN, Oct. 3-12, 2018, Total 7 pages.

(Continued)

*Primary Examiner* — Jeremiah C Hallenbeck-Huber
(74) *Attorney, Agent, or Firm* — WOMBLE BOND DICKINSON (US) LLP

(57) ABSTRACT

The present disclosure relates to video encoding and decoding, and in particular to determining motion information for a current block using a history-based motion vector predictor, HMVP, list. The HMVP list is constructed, with said list being an ordered list of N HMVP candidates $H_k$, k=0, ..., N−1, which are associated with motion information of N preceding blocks of the frame and precede the current block. Each HMVP candidate has motion information including elements of one or more motion vectors, MVs, one or more reference picture indices corresponding to the MVs, and one or more bi-prediction weight indices. One or more HMVP candidates from the HMVP list are added into a motion
(Continued)

information candidate list for the current block; and the motion information is derived based on the motion information candidate list.

8 Claims, 10 Drawing Sheets

Related U.S. Application Data continuation of application No. PCT/RU2019/050196, filed on Oct. 24, 2019.

(60) Provisional application No. 62/909,761, filed on Oct. 2, 2019, provisional application No. 62/750,250, filed on Oct. 24, 2018.

(51) Int. Cl.
  *H04N 19/176* (2014.01)
  *H04N 19/577* (2014.01)

(56) References Cited

U.S. PATENT DOCUMENTS

| 2013/0083853 | A1 | 4/2013 | Coban et al. |
| 2014/0044180 | A1* | 2/2014 | Chen ..................... H04N 19/51 375/240.16 |
| 2020/0186820 | A1 | 6/2020 | Park et al. |

FOREIGN PATENT DOCUMENTS

| CN | 102946536 | A | 2/2013 |
| CN | 103338372 | A | 10/2013 |
| CN | 104170381 | A | 11/2014 |
| CN | 107148778 | A | 9/2017 |
| JP | 2022502972 | A | 1/2022 |
| WO | 2019223746 | A1 | 11/2019 |
| WO | 2020030187 | A1 | 2/2020 |

OTHER PUBLICATIONS

ITU-T H.261 (03/93), Line Transmission of Non-Telephone Signals, Video Codec for Audiovisual Services At p x 64 kbits, total 29 pages.
Document: JVET-L0401, Wei-Jung Chien et al, CE4-related: Modification on History-based Mode Vector Prediction, Joint Video Exploration Team (JVET) of ITU-T SG 16 WP 3 and 1S0/IEC JTC 1/SC 29/WG11, 12th Meeting: Macao, CN, Oct. 3-12, 2018, Total 6 pages.
ITU-T H.262 (Feb. 2012), Series H: Audiovisual and Multimedia Systems, Infrastructure of audiovisual services—Coding of moving video Information technology—Generic coding of moving pictures and associated audio Information: Video: Frame packing arrangement signalling for 3D content, total 238 pages.
Document: JVET-L0425-v6 , Timofey Solovyev et al, CE4-related: History-based MVP without using the last lookup table entry, Joint Video Experts Team (JVET) of ITU-T SG 16 WP 3 and 1S0/IEC JTC 1/SC 29/WG11, 12th Meeting: Macao, CN, Oct. 3-12, 2018, Total 5 pages.
ITU-T H.263(Jan. 2005), Series H: Audiovisual and Multimedia Systems, Infrastructure of audiovisual services—Coding of moving video, Video coding for low bit rate communication, total 226 pages.
ITU-T H.264(Apr. 2017), Series H: Audiovisual and Multimedia Systems, Infrastructure of audiovisual services—Coding of moving video, Advanced video coding for generic audiovisual services, total 812 pages.
ITU-T H.265(Feb. 2018), Series H: Audiovisual and Multimedia Systems Infrastructure of audiovisual services—Coding of moving video, High efficiency video coding, total 692 pages.
Document: JVET-C0047, Chun-Chi Chen et al, Generalized bi-prediction for inter coding, Joint Video Exploration Team (JVET) of ITU-T SG 16 WP 3 and ISO/IEC JTC 1/SC 29/WG 11, 3rd Meeting: Geneva, CH, May 26-Jun. 1, 2016, total 4 pages.
Document: JVET-K0104-v5, Li Zhang et al, CE4-related: History-based Motion Vector Prediction, Joint Video Experts Team (JVET) of ITU-T SG 16 WP 3 and ISO/IEC JTC 1/SC 29/WG 11, 11th Meeting: Ljubljana, SI, Jul. 10-18, 2018, total 7 pages.
Shigeru Fukushima et al.,"Non-CE9: Mere candidates pruning without reference index", Joint Collaborative Team on Video Coding (JCT-VC) of ITU-T SG16 WP3 and ISO/IEC JTC1/SC29/WGII,8th Meeting: San Jose, CA, USA, Feb. 1-10, 2012,JCTVC-H0077, total:6pages.
Timofey Solovyev et al., "Non-CE4: On switchable interpolation filter and bi-prediction weight indices cleanup", Joint Video Experts Team (JVET) of ITU-T SG 16 WP 3 and ISO/IEC JTC 1/SC 29/WG 11,16th Meeting: Geneva, CH, 1 Oct. 11, 2019,JVET-P0856-v1, total:5pages.
Bross, Bejamin; Chen, Jianle; Liu, Shan; "Working Draft 3 of Versatile Video Coding"; ISO/I EC JTC 1 /SC29/WG11; Oct. 12, 2018 (Year: 2018).
"MPEG 124—Macau"; 2018; MPEG: The Moving Picture Experts Group; https://mpeg.chiariglione.org/meetings/124 (Year: 2018).
"MPEG-Versatile Video Coding"; 2018; MPEG: The Moving Picture Experts Group; https://mpeg.chiariglione.org/ standards/mpeg-i/ versatile-video-coding (Year: 2018).
"MPEG-Working Draft 3 of Versatile Video Coding"; 2018; MPEG: The Moving Picture Experts Group; https://mpeg.chiariglione.org/ standards/mpeg-i/versati le-video-coding/worki ng-draft-3-versatile-video-codi ng (Year: 2018).
Document: JVET-L0266-v1, Li Zhang et al, Suggested specification changes for JVET-L0266, Joint Video Experts Team (JVET) of ITU-T SG 16 WP 3 and ISO/IEC JTC 1/SC 29/WG 11, 12th Meeting: Macao, CN, Oct. 3-12, 2018, total 6 pages, XP030250949.
Document: JVET-N0309, Anastasia Henkel et al, Non-CE4: Switched half-pel interpolation filter, Joint Video Experts Team (JVET) of ITU-T SG 16 WP 3 and ISO/IEC JTC 1/SC 29/WG 11, 14th Meeting: Geneva, CH, Mar. 19-27, 2019, 7 pages.
Su, Yu-Chi et al., CE4-related: Generalized Bi-Prediction Improvements Combined from JVET-L0197 and JVET-L0296, JVET-L0646 (version 6), ITU, Oct. 8, 2018, pp. 1-6, [online], [retrieved on Apr. 12, 2023], Retrieved from the Internet: URL: https://jvet-experts.org/doc_end_user/documents/12_Macao/wg11/JVET-L0646-v6.zip>, JVET-L0646-v5-clean.docx (publication showing well-known technology) (newly cited document).
Su, Yu-Chi et al., CE4-related: Generalized Bi-Prediction Improvements Combined from JVET-L0197 and JVET-L0296, JVET-L0646 (version 6), ITU, Oct. 8, 2018, pp. 1, 69-76, 90-93, 100, 101, [online], [retrieved on Apr. 12, 2023], Retrieved from the Internet: URL: https://jvet-experts.org/doc_end_user/documents/12_Macao/wg11/JVET-L0646-v6.zip>, JVET-L0646_DraftText.docx (publication showing well-known technology) (newly cited document).

* cited by examiner

VIDEO DECODER AND METHODS

CROSS-REFERENCE TO RELATED APPLICATIONS

This application is a continuation of U.S. patent application Ser. No. 17/237,924, filed on Apr. 22, 2021, which is a continuation of International Application No. PCT/RU2019/050196, filed on Oct. 24, 2019. which claims the priority of U.S. provisional application No. 62/750,250, filed on Oct. 24, 2018 and U.S. provisional application No. 62/909,761, filed on Oct. 2, 2019. All of the aforementioned patent applications are hereby incorporated by reference in their entireties.

TECHNICAL FIELD

The disclosure is in the field of video coding and more particularly in the field of motion compensation by inter prediction.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

Since the development of the block-based hybrid video coding approach in the H.261 standard in 1990, new video coding techniques and tools were developed and formed the basis for new video coding standards. Further video coding standards comprise MPEG-1 video, MPEG-2 video, ITU-T H.262/MPEG-2, ITU-T H.263, ITU-T H.264/MPEG-4, Part 10, Advanced Video Coding (AVC), ITU-T H.265/High Efficiency Video Coding (HEVC), ITU-T H.266/Versatile video coding (VVC) and extensions, e.g., scalability and/or three-dimensional (3D) extensions, of these standards. As the video creation and use have become more and more ubiquitous, video traffic is the biggest load on communication networks and data storage, accordingly, one of the goals of most of the video coding standards was to achieve a bitrate reduction compared to its predecessor without sacrificing picture quality. Even though the latest High Efficiency video coding (HEVC) can compress video about twice as much as AVC without sacrificing quality, it is desirable to further compress video as compared with HEVC.

SUMMARY

The present disclosure provides apparatuses and methods for encoding and decoding video. In particular, embodiments of the present disclosure relate to generalized bi-prediction method of an inter-prediction apparatus. More specifically, the following aspects are described:
1. A History-based motion information list construction modification: the motion information of current block entails besides motion vector(s) and respective reference picture indices, also a generalized bi-prediction weight index (bcwIdx index) of current block.
2. A bcwIdx index derivation procedure modification for merge mode: for blocks having a merge index corresponding to a history-based candidate, the bcwIdx index of this candidate is used for the current block.

The modified bcwIdx index derivation method improves the coding efficiency by using a more appropriate bcwIdx index for a CUs, which is coded in merge mode and has a merge index corresponding to History-based merge candidates.

The foregoing and other objects are achieved by the subject matter of the independent claims. Further implementation forms are apparent from the dependent claims, the description and the figures.

Embodiments of the disclosure are defined by the features of the independent claims, and further advantageous implementations of the embodiments by the features of the dependent claims.

According to an aspect of the present disclosure, a method is provided for determining motion information for a current block of a frame based on a history-based motion vector predictor, HMVP, list, comprising the operations: constructing the HMVP list, which is an ordered list of N history-based candidates $H_k$, k=0, ..., N−1, associated with motion information of N preceding blocks of the frame preceding the current block, wherein N is greater than or equal to 1, wherein each history-based candidate comprises motion information including elements: i) one or more motion vectors, MVs, ii) one or more reference picture indices corresponding to the MVs, and iii) one or more bi-prediction weight indices; adding one or more history-based candidates from the HMVP list into a motion information candidate list for the current block; and deriving the motion information based on the motion information candidate list.

The term bi-prediction weight index, bcw_idx, is referred also as generalized bi-prediction weight index, GBIdx and/or Bi-prediction with CU-level Weights (BCW) index. Alternatively, said index may be abbreviated by BWI referring simply as bi-prediction weight index.

The motion information candidate list may be a merge candidate list or a motion vector predictor list.

The HMVP list may be also referred to as History-based motion vector list, HMVL.

In one exemplary embodiment, the motion information of a HMVP candidate may include as element one bi-prediction weight index, if there are more than one motion vectors MVs, in particular when the number of MVs is two. One bcw index is sufficient since the sum of the two bcw weights, $w_0$ and $w_1$, used to construct a prediction candidate is one. In other words, the bcw weight pair is normalized. This means that the two weights are defined by only one bcw index of its respective bcw weight, for example, of $w_0$ or $w_1$.

This may provide an advantage that only necessary elements are part of the motion information while redundant elements (as result of the knowledge that the bcw weights are normalized) are dismissed. Hence, the motion information requires only low storage.

An alternative embodiment may include using one bcw index for each MV, but setting one bcw index corresponding to zero bcw weight.

According to an aspect of the present disclosure, a history-based candidate includes further one or more indices, different from the one or more bi-prediction weight indices.

The one or more indices may be used to indicate the use of alternative interpolation filters for the interpolation of a block during the motion compensation. In one exemplary embodiment, one of the further indices may be a switchable interpolation filter index.

This may provide an advantage of making the derivation of motion information more flexible by use of other indices.

According to an aspect of the present disclosure, the constructing of the HMVP list further comprises: comparing at least one of the elements of each history-based candidate of the HMVP list with the corresponding element of the preceding block; and adding the motion information of the preceding block to the HMVP list, if as a result of the comparing at least one of the elements of each history-based candidate of the HMVP list differs from the corresponding element of the preceding block.

According to an aspect of the present disclosure, the method further comprises: comparing at least one of the elements of each history-based candidate of the HMVP list with the corresponding element of the motion information for the current block; and adding the motion information of the current block to the HMVP list, if as a result of the comparing at least one of the elements of each HMVP candidate of the HMVP list differs from the corresponding element of the motion information of the current block.

The comparing of a HMVP candidate from the HMVP list with a preceding block and/or current block means that said comparison is performed on an element-by-element basis Further, the result of the comparing (also referred to as C-result) has its usual meaning in terms of a simple comparison of elements whether or not the like-element(s) are the same or differ. In other words, the C-result of the at least one or more elements may indicate that the HMVP candidate and the preceding and/or current block may differ in at least one element. If that is the case (i.e. the C-result=different), the respective motion information of the preceding block and/or current block is added to the HMVP list.

This may provide an advantage of removing redundancies in the motion information from the HMVP list. Since the HMVP list is used to add motion information therefrom into the motion information candidate list, said redundancy avoidance translates directly onto the motion information candidate list. Hence, the motion information derivation becomes more accurate as no duplicate motion information is used.

Moreover, since the HMVP list has a limited size/length, the removal of redundant motion information (records) from the HMVP list allows for the addition of more records that are actually different. In other words, the diversity of the records in the HMVP list is increased.

According to an aspect of the present disclosure, the comparing comprises: comparing the corresponding motion vectors, and comparing the corresponding reference picture indices.

According to an aspect of the present disclosure, the comparing comprises: comparing the corresponding motion vectors, comparing the corresponding reference picture indices, and comparing the bi-prediction weight indices.

The comparing of motion vectors may be performed component-wise. This means that a motion vector MV having two components, $MV_x$ and $MV_y$ (also referred to as horizontal and vertical components, respectively), is compared with respect to each component $MV_x$ and $MV_y$. Specifically, the comparing is performed based on a simple comparing whether or not a MV component is different or not.

Alternatively, the comparing of the corresponding motion vectors may be based on any other metric suitable for said comparison. Such a metric may, for example, be the p-norm with $p>=1$. The MV comparing may include comparing the magnitude of the MVs.

The comparing of the reference indices may be also based on a simple comparison in terms of checking whether or not the reference picture indices are different.

In an embodiment, the simple comparison may be extended by comparing whether at least one of the elements of the HMVP candidates is equal and/or smaller than the corresponding element of the preceding block and/or current block. Alternatively and or in addition, as comparing criteria the "equal and/or larger" may be used. Said smaller/larger criteria may be applied differently for each of the elements of the motion information.

As mentioned before, the comparison is performed element-by-element. In particular, the comparison may include all elements of the motion information. Alternatively, some of the elements may be used in the comparison. In other words, a subset of elements of the motion information may be used for the comparison, in view of the motion information comprising i) one or more MVs, ii), one or more reference picture indices, iii) a bi-prediction weight index. Also, said motion information may entail iv) one or more indices different from the bcw index.

For example, a subset of elements of the motion information may include the above MVs and the reference picture indices. The comparison would then be performed only on checking differences with respect to the MVs and the reference picture indices, irrespective of whether or not the other elements (not part of the subset) are the same. In the given subset example, these elements excluded from the comparison would be the bcw index and the one or more other indices different from the bcw index.

In a second example, the subset may include as elements of the motion information the MVs, the reference picture indices, and the bi-prediction index. The one or more other indices different from the bcw index are excluded from this subset. In this case, the comparison is performed in terms of checking differences with respect to these three types of elements.

Hence, while the motion information may entail multiple elements, the comparison may be performed element-wise based on a subset of elements from said motion information.

This may provide an advantage of performing the comparison and hence the pruning of motion information to be added to the HMVP list or not in a flexible manner, since the restriction level of the comparison may be adapted by the number and/or type of elements used from the motion information.

According to an aspect of the present disclosure, the history-based candidates of the HMVP list are ordered in an order in which the history-based candidates of the preceding blocks are obtained from a bit stream.

According to an aspect of the present disclosure, the HMVP list has a length of N, and N is 6 or 5.

According to an aspect of the present disclosure, the motion information candidate list includes: a first motion information from motion information of a first block, wherein the first block has a preset spatial or temporal position relationship with the current block.

According to an aspect of the present disclosure, the deriving the motion information based on the motion information candidate list comprises: deriving the motion information by referring to a merge index from a bit stream as the current block is coded in a merge mode, or to a motion vector predictor index from the bit stream as the current block is coded in an advanced motion vector prediction, AMVP, mode.

The motion information candidate list may be a merge candidate list or a motion vector predictor list.

FIG. 10 shows a flowchart of the method for determining motion information. In operation 1001, a HMVP list is constructed. In operation 1002, one or more history-based candidates from the HMVP list are added into a motion information candidate list. In operation 1003, the motion information based on the motion information candidate list is derived.

According to an aspect of the present disclosure, further included is obtaining a prediction value of the current block by using a bi-prediction weight index included in the motion information derived based on the motion information candidate list.

In one exemplary embodiment, the motion information derivation based on the motion information candidate list is performed directly from the motion information candidate list. Alternatively, said derivation may be performed indirectly with reference to the motion information candidate list.

According to an aspect of the present disclosure, a method is provided for constructing and updating a history-based motion vector predictor, HMVP, list, comprising the operations: constructing the HMVP list, which is an ordered list of N history-based candidates $H_k$, k=0, . . . , N−1, associated with motion information of N preceding blocks of the frame preceding the current block, wherein N is greater than or equal to 1, wherein each history-based candidate comprises motion information including elements: i) one or more motion vectors, MVs, ii) one or more reference picture indices corresponding to the MVs, and iii) one or more bi-prediction weight indices; comparing at least one of the elements of each history-based candidate of the HMVP list with the corresponding element of the current block; and adding the motion information of the current block to the HMVP list, if as a result of the comparing at least one of the elements of each of the history-based candidate of the HMVP list differs from the corresponding element of the current block.

The HMVP list updating may provide an advantage of keeping the latest and redundancy-free motion information of the current block in the HMVP list. This improves the motion information derivation by using history-based motion information with maintained spatial correlation with the current block. In other words, the continued updating of the HMVP list ensures the presence and exploitation of spatial correlation during the derivation of the motion information.

According to an aspect of the present disclosure, a history-based candidate includes further one or more indices, different from the one or more bi-prediction weight indices.

According to an aspect of the present disclosure, the comparing comprises: comparing the corresponding motion vectors, and comparing the corresponding reference picture indices.

According to an aspect of the present disclosure, the comparing comprises: comparing the corresponding motion vectors, comparing the corresponding reference picture indices, and comparing the bi-prediction weight indices.

According to an aspect of the present disclosure, the history-based candidates of the HMVP list are ordered in an order in which the history-based candidates of the preceding blocks are obtained from a bit stream.

According to an aspect of the present disclosure, the HMVP list has a length of N, and N is 6 or 5.

FIG. 11 shows a flowchart of the method for constructing and updating a history-based motion vector predictor. In operation 1101, a HMVP list is constructed. In operation 1102, at least one of the elements of each history-based candidate of the HMVP list are compared with the corresponding element of the current block.

The result of the element-based comparison is referred to as C-result in FIG. 11. The C-result may be that all elements are the same/equal or at least one or more elements are not the same/unequal/different.

If the C-result is that at least one or more elements are different, the motion information of the current block is added to the HMVP list (operation 1103). Otherwise, if all elements are the same, the respective motion information is not added to the HMVP list (operation 1104).

The term "all" refers to those elements that are actually used in the element-wise comparison. This means that a subset of elements of the motion information may be used for the comparison, in view of the motion information comprising i) one or more MVs, ii), one or more reference picture indices, iii) a bi-prediction weight index. Also, said motion information may entail iv) one or more indices different from the bcw index.

For example, as a possible subset of elements of the motion information may include the MVs and the reference picture indices. The above comparison would then be performed only on checking differences with respect to the MVs and the reference picture indices, irrespective of whether or not the other elements not part of the subset are the same. In the given example, these elements excluded from the comparison would be the bcw index and the one or more other indices different from the bcw index.

Hence, while the motion information may entail multiple elements, the comparison may be performed element-wise based on a subset of elements from said motion information.

This may provide an advantage of performing the comparison and hence the pruning of motion information to be added to the HMVP list or not in a flexible manner, since the restriction level of the comparison may be adapted by the number and/or type of elements used from the motion information.

According to an aspect of the present disclosure, an apparatus is provided for determining motion information for a current block, comprising: a memory and a processor coupled to the memory; and the processor is configured to execute the method according to any one of the previous aspects of the present disclosure.

FIG. 12 shows a schematic of Motion Information Determining Unit 1200 which comprises a memory 1201 and a processor 1202, respectively.

According to an aspect of the present disclosure, an apparatus is provided for determining motion information for a current block of a frame based on a history-based motion vector predictor, HMVP, list, comprising: a HMVP list constructing unit configured to construct the HMVP list, which is an ordered list of N history-based candidates $H_k$, k=0, . . . , N−1, associated with motion information of N preceding blocks of the frame preceding the current block, wherein N is greater than or equal to 1, wherein each history-based candidate comprises motion information including elements: i) one or more motion vectors, MVs, ii) one or more reference picture indices corresponding to the MVs, and iii) one or more bi-prediction weight indices; a HMVP adding unit configured to add one or more history-based candidates from the HMVP list into a motion information candidate list for the current block; and a motion information deriving unit configured to derive the motion information based on the motion information candidate list.

FIG. 13 shows a schematic of the Motion Information Determining Unit 1200 which comprises further HMVP list constructing unit 1301, HMVP adding unit 1302, and Motion information deriving unit 1303.

According to an aspect of the present disclosure, an apparatus is provided for constructing and updating a history-based motion vector predictor, HMVP, list, comprising: a HMVP list constructing unit configured to construct the HMVP list, which is an ordered list of N history-based candidates $H_k$, k=0, . . . , N−1, associated with motion information of N preceding blocks of the frame preceding the current block, wherein N is greater than or equal to 1, wherein each history-based candidate comprises motion information including elements: i) one or more motion vectors, MVs, ii) one or more reference picture indices corresponding to the MVs, and iii) one or more bi-prediction weight indices; a motion information comparing unit configured to compare at least one of the elements of each history-based candidate of the HMVP list with the corresponding element of the current block; and a motion information adding unit configured to add the motion information of the current block to the HMVP list, if as a result of the comparing at least one of the elements of each of the history-based candidate of the HMVP list differs from the corresponding element of the current block.

FIG. 14 shows a schematic of HMVP List Updating Unit 1400 which comprises the HMVP list constructing unit 1301, Motion information comparing unit 1401, and Motion information adding unit 1402.

According to an aspect of the present disclosure, a computer program product is provided comprising a program code for performing the method according to any one of the previous aspects of the present disclosure.

Details of one or more embodiments are set forth in the accompanying drawings and the description below. Other features, objects, and advantages will be apparent from the description, drawings, and claims.

This embodiment has the advantage of optimizing the choice of the boundary shift vector and, therefore, of optimizing the coding efficiency of the encoding method.

Embodiments of the present disclosure can be implemented in hardware and/or software.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

In the following embodiments of the disclosure are described in more detail with reference to the attached figures and drawings, in which.

Figure 1A:
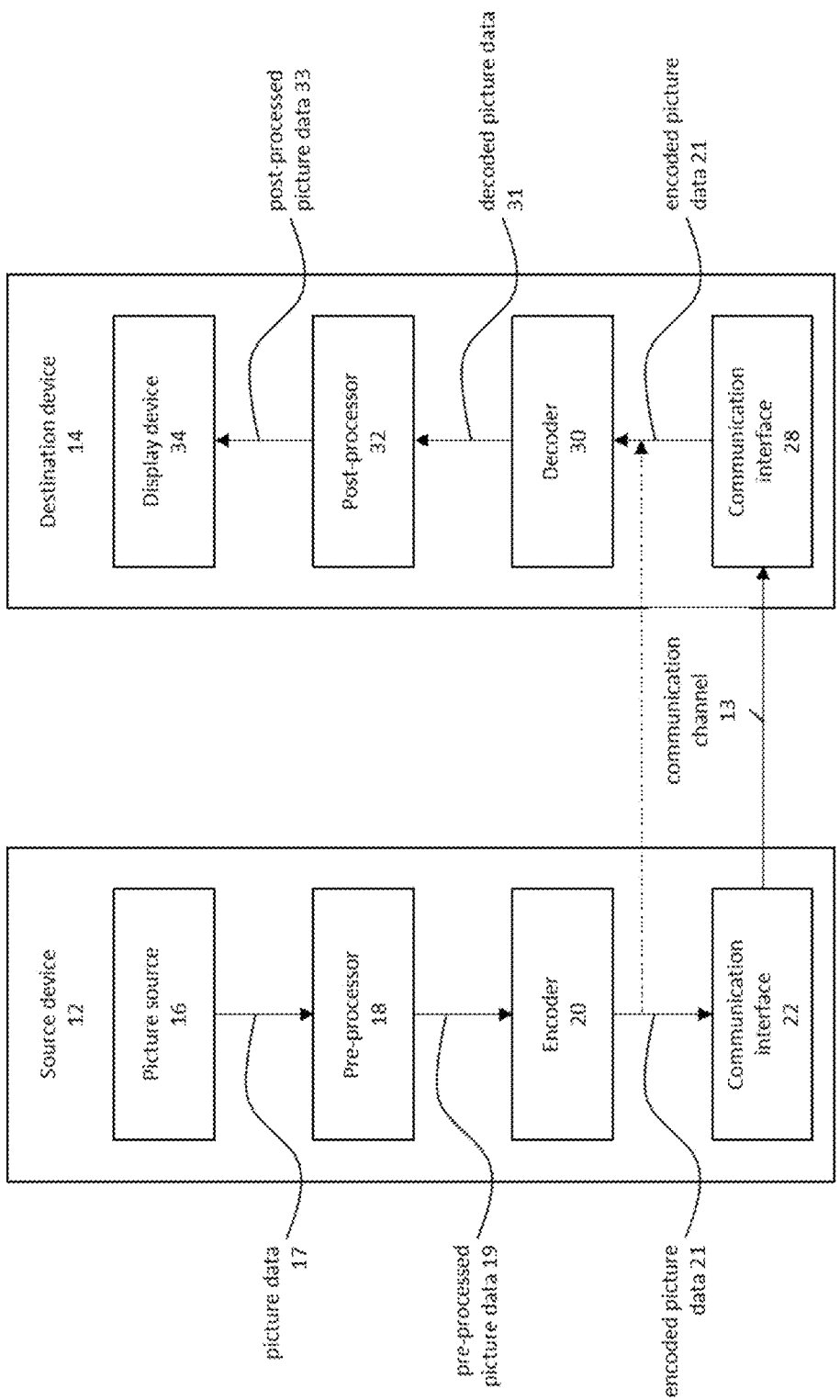
FIG. 1A is a block diagram showing an example of a video coding system configured to implement embodiments of the disclosure.

In the following identical reference signs refer to identical or at least functionally equivalent features if there is not specific note regarding to the difference of those identical reference signs.

DETAILED DESCRIPTION OF THE EMBODIMENTS

In the following description, reference is made to the accompanying figures, which form part of the present disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g., functional units, to perform the described one or plurality of method operations (e.g., one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g., functional units, a corresponding method may include one operation to perform the functionality of the one or plurality of units (e.g., one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding used in the present application (or present disclosure) indicates either video encoding or video decoding. Video encoding is performed at the source side, typically comprising processing (e.g., by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to either "encoding" or "decoding" for video sequence. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g., by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g., by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is partially applied to the encoded or compressed block to reconstruct the current block for representation. Furthermore, the encoder duplicates the decoder processing loop such that both will generate identical predictions (e.g., intra- and inter predictions) and/or re-constructions for processing, i.e. coding, the subsequent blocks.

As used herein, the term "block" may a portion of a picture or a frame. For convenience of description, embodiments of the present disclosure are described herein in reference to High-Efficiency Video Coding (HEVC) or the reference software of Versatile video coding (VVC), developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the present disclosure are not limited to HEVC or VVC. It may refer to a CU, PU, and TU. In HEVC, a CTU is split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. In the newest development of the video compression technical, Qual-tree and binary tree (QTBT) partitioning frame is used to partition a coding block. In the QTBT block structure, a CU can have either a square or rectangular shape. For example, a coding tree unit (CTU) is first partitioned by a quadtree structure. The quadtree leaf nodes are further partitioned by a binary tree structure. The binary tree leaf nodes are called coding units (CUs), and that segmentation is used for prediction and transform processing without any further partitioning. This means that the CU, PU and TU have the same block size in the QTBT coding block structure. In parallel, multiply partition, for example, triple tree partition was also proposed to be used together with the QTBT block structure.

In the following embodiments of an encoder 20, a decoder 30 and a coding system 10 are described based on FIGS. 1 to 3.

FIG. 1A schematically illustrates an example coding system 10, e.g., a video coding system 10 that may utilize techniques of this present application (present disclosure). Encoder 20 (e.g., Video encoder 20) and decoder 30 (e.g., video decoder 30) of video coding system 10 represent examples of devices that may be configured to perform techniques in accordance with various examples described in the present application. As shown in FIG. 1A, the coding system 10 comprises a source device 12 configured to provide encoded data 13, e.g., an encoded picture 13, e.g., to a destination device 14 for decoding the encoded data 13.

The source device 12 comprises an encoder 20, and may additionally, in one embodiment, comprise a picture source 16, a pre-processing unit 18, e.g., a picture pre-processing unit 18, and a communication interface or communication unit 22.

The picture source 16 may comprise or be any kind of picture capturing device, for example for capturing a real-world picture, and/or any kind of a picture or comment (for screen content coding, some texts on the screen is also considered a part of a picture or image to be encoded) generating device, for example a computer-graphics processor for generating a computer animated picture, or any kind of device for obtaining and/or providing a real-world picture, a computer animated picture (e.g., a screen content, a virtual reality (VR) picture) and/or any combination thereof (e.g., an augmented reality (AR) picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance/chrominance format or color space, e.g., YCbCr, which comprises a luminance component indicated by Y (sometimes also L is used instead) and two chrominance components indicated by Cb and Cr. The luminance (or short luma) component Y represents the brightness or grey level intensity (e.g., like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 16 (e.g., video source 16) may be, for example a camera for capturing a picture, a memory, e.g., a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g., integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g., a wired or wireless interface, an optical interface, according to any proprietary or standardized interface protocol. The interface for obtaining the picture data 17 may be the same interface as or a part of the communication interface 22.

In distinction to the pre-processing unit 18 and the processing performed by the pre-processing unit 18, the picture or picture data 17 (e.g., video data 16) may also be referred to as raw picture or raw picture data 17.

Pre-processing unit 18 is configured to receive the (raw) picture data 17 and to perform pre-processing on the picture data 17 to obtain a pre-processed picture 19 or pre-processed picture data 19. Pre-processing performed by the pre-processing unit 18 may, e.g., comprise trimming, color format conversion (e.g., from RGB to YCbCr), color correction, or de-noising. It can be understood that the pre-processing unit 18 may be optional component.

The encoder 20 (e.g., video encoder 20) is configured to receive the pre-processed picture data 19 and provide encoded picture data 21 (further details will be described below, e.g., based on FIG. 2 or FIG. 4).

Communication interface 22 of the source device 12 may be configured to receive the encoded picture data 21 and to transmit it to another device, e.g., the destination device 14 or any other device, for storage or direct reconstruction, or to process the encoded picture data 21 for respectively before storing the encoded data 13 and/or transmitting the encoded data 13 to another device, e.g., the destination device 14 or any other device for decoding or storing.

The destination device 14 comprises a decoder 30 (e.g., a video decoder 30), and may additionally, in one embodiment, comprise a communication interface or communication unit 28, a post-processing unit 32 and a display device 34.

The communication interface 28 of the destination device 14 is configured receive the encoded picture data 21 or the encoded data 13, e.g., directly from the source device 12 or from any other source, e.g., a storage device, e.g., an encoded picture data storage device.

The communication interface 22 and the communication interface 28 may be configured to transmit or receive the encoded picture data 21 or encoded data 13 via a direct communication link between the source device 12 and the destination device 14, e.g., a direct wired or wireless connection, or via any kind of network, e.g., a wired or wireless network or any combination thereof, or any kind of private and public network, or any kind of combination thereof.

The communication interface 22 may be, e.g., configured to package the encoded picture data 21 into an appropriate format, e.g., packets, for transmission over a communication link or communication network.

The communication interface 28, forming the counterpart of the communication interface 22, may be, e.g., configured to de-package the encoded data 13 to obtain the encoded picture data 21.

Both, communication interface 22 and communication interface 28 may be configured as unidirectional communication interfaces as indicated by the arrow for the encoded picture data 13 in FIG. 1A pointing from the source device 12 to the destination device 14, or bi-directional communication interfaces, and may be configured, e.g., to send and receive messages, e.g., to set up a connection, to acknowledge and exchange any other information related to the communication link and/or data transmission, e.g., encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g., the decoded picture 31, to obtain post-processed picture data 33, e.g., a post-processed picture 33. The post-processing performed by the post-processing unit 32 may comprise, e.g., color format conversion (e.g., from YCbCr to RGB), color correction, trimming, or re-sampling, or any other processing, e.g., for preparing the decoded picture data 31 for display, e.g., by display device 34.

The display device 34 of the destination device 14 is configured to receive the post-processed picture data 33 for displaying the picture, e.g., to a user or viewer. The display device 34 may be or comprise any kind of display for representing the reconstructed picture, e.g., an integrated or external display or monitor. The displays may, e.g., comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

The encoder 20 (e.g., a video encoder 20) and the decoder 30 (e.g., a video decoder 30) each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

Source device 12 may be referred to as a video encoding device or a video encoding apparatus. Destination device 14 may be referred to as a video decoding device or a video decoding apparatus. Source device 12 and destination device 14 may be examples of video coding devices or video coding apparatuses.

Source device 12 and destination device 14 may comprise any of a wide range of devices, including any kind of handheld or stationary devices, e.g., notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system.

In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

It should be understood that, for each of the above examples described with reference to video encoder 20, video decoder 30 may be configured to perform a reciprocal process. With regard to signaling syntax elements, video decoder 30 may be configured to receive and parse such syntax element and decode the associated video data accordingly. In some examples, video encoder 20 may entropy encode one or more syntax elements into the encoded video bitstream. In such examples, video decoder 30 may parse such syntax element and decode the associated video data accordingly.

Figure 1B:
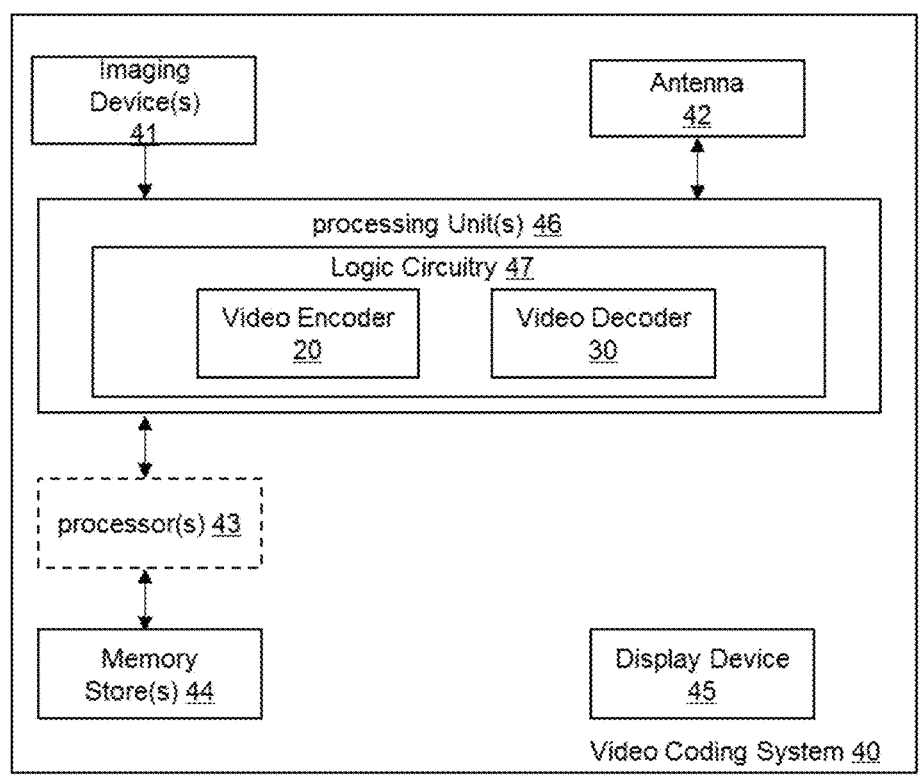
FIG. 1B is a block diagram showing another example of a video coding system configured to implement embodiments of the disclosure.
Figure 2:
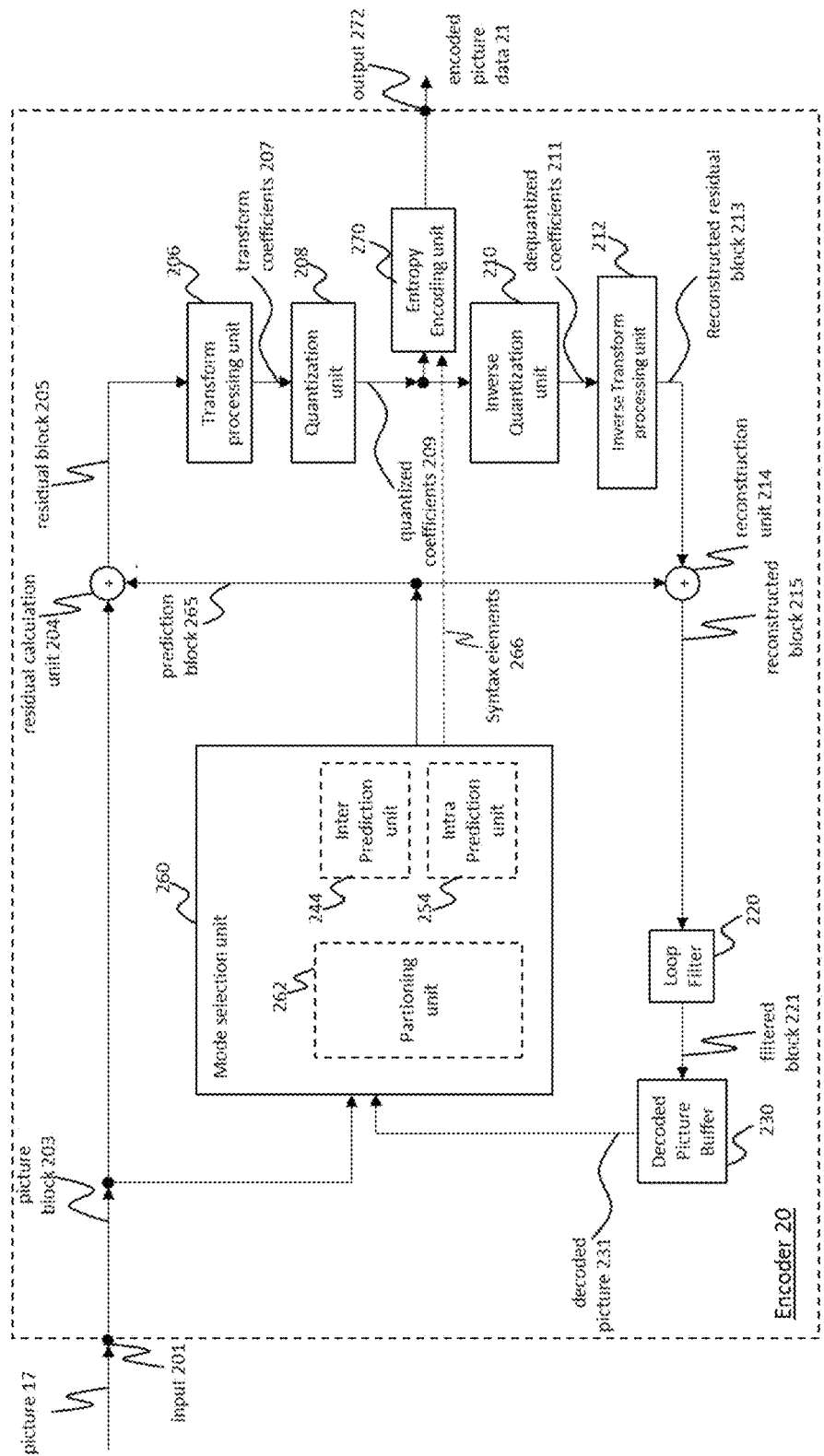
FIG. 2 is a block diagram showing an example of a video encoder configured to implement embodiments of the disclosure.
Figure 3:
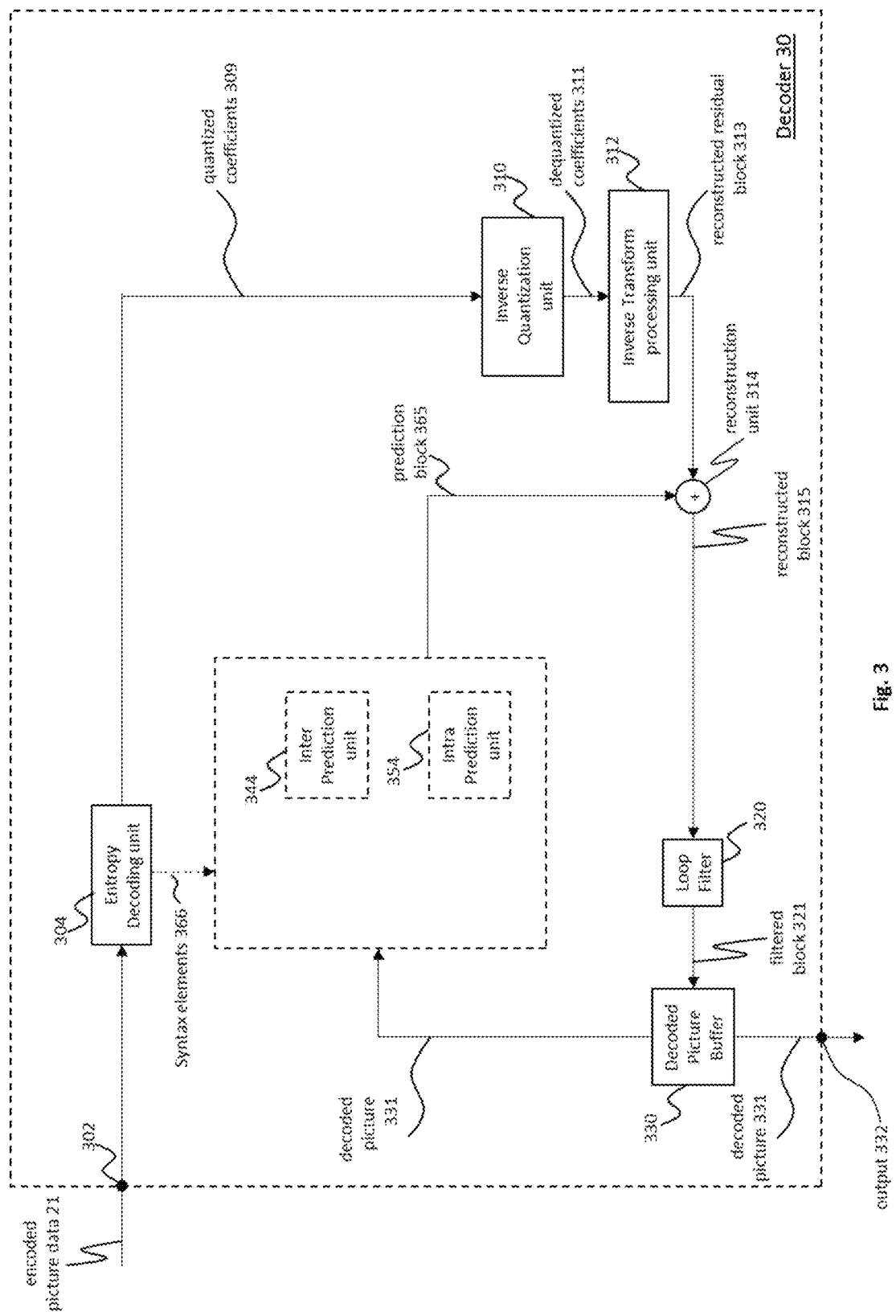
FIG. 3 is a block diagram showing an example structure of a video decoder configured to implement embodiments of the disclosure.

FIG. 1B is an illustrative diagram of another example video coding system 40 including encoder 20 of FIG. 2 and/or decoder 30 of FIG. 3 according to an exemplary embodiment. The system 40 can implement techniques of this present application in accordance with various examples described in the present application. In the illustrated implementation, video coding system 40 may include imaging device(s) 41, video encoder 100, video decoder 30 (and/or a video coder implemented via logic circuitry 47 of processing unit(s) 46), an antenna 42, one or more processor(s) 43, one or more memory store(s) 44, and/or a display device 45.

As illustrated, imaging device(s) 41, antenna 42, processing unit(s) 46, logic circuitry 47, video encoder 20, video decoder 30, processor(s) 43, memory store(s) 44, and/or display device 45 may be capable of communication with one another. As discussed, although illustrated with both video encoder 20 and video decoder 30, video coding system 40 may include only video encoder 20 or only video decoder 30 in various examples.

As shown, in some examples, video coding system 40 may include antenna 42. Antenna 42 may be configured to transmit or receive an encoded bitstream of video data, for example. Further, in some examples, video coding system 40 may include display device 45. Display device 45 may be configured to present video data. As shown, in some examples, logic circuitry 47 may be implemented via processing unit(s) 46. Processing unit(s) 46 may include application-specific integrated circuit (ASIC) logic, graphics processor(s), general purpose processor(s), or the like. Video coding system 40 also may include optional processor(s) 43, which may similarly include application-specific integrated circuit (ASIC) logic, graphics processor(s), general purpose processor(s), or the like. In some examples, logic circuitry 47 may be implemented via hardware, video coding dedicated hardware, or the like, and processor(s) 43 may implemented general purpose software, operating systems, or the like. In addition, memory store(s) 44 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 44 may be implemented by cache memory. In some examples, logic circuitry 47 may access memory store(s) 44 (for implementation of an image buffer for example). In other examples, logic circuitry 47 and/or processing unit(s) 46 may include memory stores (e.g., cache or the like) for the implementation of an image buffer or the like.

In some examples, video encoder 100 implemented via logic circuitry may include an image buffer (e.g., via either processing unit(s) 46 or memory store(s) 44)) and a graphics processing unit (e.g., via processing unit(s) 46). The graphics processing unit may be communicatively coupled to the image buffer. The graphics processing unit may include video encoder 100 as implemented via logic circuitry 47 to embody the various modules as discussed with respect to FIG. 2 and/or any other encoder system or subsystem described herein. The logic circuitry may be configured to perform the various operations as discussed herein.

Video decoder 30 may be implemented in a similar manner as implemented via logic circuitry 47 to embody the various modules as discussed with respect to decoder 30 of FIG. 3 and/or any other decoder system or subsystem described herein. In some examples, video decoder 30 may be implemented via logic circuitry may include an image buffer (e.g., via either processing unit(s) 420 or memory store(s) 44)) and a graphics processing unit (e.g., via processing unit(s) 46). The graphics processing unit may be communicatively coupled to the image buffer. The graphics processing unit may include video decoder 30 as implemented via logic circuitry 47 to embody the various modules as discussed with respect to FIG. 3 and/or any other decoder system or subsystem described herein.

In some examples, antenna 42 of video coding system 40 may be configured to receive an encoded bitstream of video data. As discussed, the encoded bitstream may include data, indicators, index values, mode selection data, or the like associated with encoding a video frame as discussed herein, such as data associated with the coding partition (e.g., transform coefficients or quantized transform coefficients, optional indicators (as discussed), and/or data defining the coding partition). Video coding system 40 may also include video decoder 30 coupled to antenna 42 and configured to decode the encoded bitstream. The display device 45 configured to present video frames.

Encoder & Encoding Method

FIG. 2 schematically illustrates an example of a video encoder 20 that is configured to implement the techniques of the present application. In the example of FIG. 2, the video encoder 20 comprises a residual calculation unit 204, a transform processing unit 206, a quantization unit 208, an inverse quantization unit 210, and inverse transform processing unit 212, a reconstruction unit 214, a buffer 216, a loop filter unit 220, a decoded picture buffer (DPB) 230, a prediction processing unit 260 and an entropy encoding unit 270. The prediction processing unit 260 may include an inter prediction unit 244, an intra prediction unit 254 and a mode selection unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

For example, the residual calculation unit 204, the transform processing unit 206, the quantization unit 208, the prediction processing unit 260 and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, prediction processing unit 260 form a backward signal path of the encoder, wherein the backward signal path of the encoder corresponds to the signal path of the decoder (see decoder 30 in FIG. 3).

The encoder 20 is configured to receive, e.g., by input 202, a picture 201 or a block 203 of the picture 201, e.g., picture of a sequence of pictures forming a video or video sequence. The picture block 203 may also be referred to as current picture block or picture block to be coded, and the picture 201 as current picture or picture to be coded (in particular in video coding to distinguish the current picture from other pictures, e.g., previously encoded and/or decoded pictures of the same video sequence, i.e. the video sequence which also comprises the current picture).

Partitioning

Embodiments of the encoder 20 may comprise a partitioning unit (not depicted in FIG. 2) configured to partition the picture 201 into a plurality of blocks, e.g., blocks like block 203, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks.

In one example, the prediction processing unit 260 of video encoder 20 may be configured to perform any combination of the partitioning techniques described above.

Like the picture 201, the block 203 again is or can be regarded as a two-dimensional array or matrix of samples with intensity values (sample values), although of smaller dimension than the picture 201. In other words, the block 203 may comprise, e.g., one sample array (e.g., a luma array in case of a monochrome picture 201) or three sample arrays (e.g., a luma and two chroma arrays in case of a color picture 201) or any other number and/or kind of arrays depending on the color format applied. The number of samples in horizontal and vertical direction (or axis) of the block 203 define the size of block 203.

Encoder 20 as shown in FIG. 2 is configured encode the picture 201 block by block, e.g., the encoding and prediction is performed per block 203.

Residual Calculation

The residual calculation unit 204 is configured to calculate a residual block 205 based on the picture block 203 and a prediction block 265 (further details about the prediction block 265 are provided later), e.g., by subtracting sample values of the prediction block 265 from sample values of the picture block 203, sample by sample (pixel by pixel) to obtain the residual block 205 in the sample domain.

Transform

The transform processing unit 206 is configured to apply a transform, e.g., a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for HEVC/H.265. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transform coefficients, tradeoff between accuracy and implementation costs, etc. Specific scaling factors are, for example, specified for the inverse transform, e.g., by inverse transform processing unit 212, at a decoder 30 (and the corresponding inverse transform, e.g., by inverse transform processing unit 212 at an encoder 20) and corresponding scaling factors for the forward transform, e.g., by transform processing unit 206, at an encoder 20 may be specified accordingly.

Quantization

The quantization unit 208 is configured to quantize the transform coefficients 207 to obtain quantized transform coefficients 209, e.g., by applying scalar quantization or vector quantization. The quantized transform coefficients 209 may also be referred to as quantized residual coefficients 209. The quantization process may reduce the bit depth associated with some or all of the transform coefficients 207. For example, an n-bit Transform coefficient may be rounded down to an m-bit Transform coefficient during quantization, where n is greater than m. The degree of quantization may be modified by adjusting a quantization parameter (QP). For example, for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or inverse dequantization, e.g., by inverse quantization 210, may include multiplication by the quantization step size. Embodiments according to some standards, e.g., HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example embodiment, the scaling of the inverse transform and dequantization might be combined. Alternatively, customized quantization tables may be used and signaled from an encoder to a decoder, e.g., in a bitstream. The quantization is a lossy operation, wherein the loss increases with increasing quantization step sizes.

The inverse quantization unit 210 is configured to apply the inverse quantization of the quantization unit 208 on the quantized coefficients to obtain dequantized coefficients 211, e.g., by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

The inverse transform processing unit 212 is configured to apply the inverse transform of the transform applied by the transform processing unit 206, e.g., an inverse discrete cosine transform (DCT) or inverse discrete sine transform (DST), to obtain an inverse transform block 213 in the sample domain. The inverse transform block 213 may also be referred to as inverse transform dequantized block 213 or inverse transform residual block 213.

The reconstruction unit 214 (e.g., Summer 214) is configured to add the inverse transform block 213 (i.e. reconstructed residual block 213) to the prediction block 265 to obtain a reconstructed block 215 in the sample domain, e.g., by adding the sample values of the reconstructed residual block 213 and the sample values of the prediction block 265.

Optional, the buffer unit 216 (or short "buffer" 216), e.g., a line buffer 216, is configured to buffer or store the reconstructed block 215 and the respective sample values, for example for intra prediction. In further embodiments, the encoder may be configured to use unfiltered reconstructed blocks and/or the respective sample values stored in buffer unit 216 for any kind of estimation and/or prediction, e.g., intra prediction.

Embodiments of the encoder 20 may be configured such that, e.g., the buffer unit 216 is not only used for storing the reconstructed blocks 215 for intra prediction 254 but also for the loop filter unit 220 (not shown in FIG. 2), and/or such that, e.g., the buffer unit 216 and the decoded picture buffer unit 230 form one buffer. Further embodiments may be configured to use filtered blocks 221 and/or blocks or samples from the decoded picture buffer 230 (both not shown in FIG. 2) as input or basis for intra prediction 254.

The loop filter unit 220 (or short "loop filter" 220), is configured to filter the reconstructed block 215 to obtain a filtered block 221, e.g., to smooth pixel transitions, or otherwise improve the video quality. The loop filter unit 220 is intended to represent one or more loop filters such as a de-blocking filter, a sample-adaptive offset (SAO) filter or other filters, e.g., a bilateral filter or an adaptive loop filter (ALF) or a sharpening or smoothing filters or collaborative filters. Although the loop filter unit 220 is shown in FIG. 2 as being an in loop filter, in other configurations, the loop filter unit 220 may be implemented as a post loop filter. The filtered block 221 may also be referred to as filtered reconstructed block 221. Decoded picture buffer 230 may store the reconstructed coding blocks after the loop filter unit 220 performs the filtering operations on the reconstructed coding blocks.

Embodiments of the encoder 20 (respectively loop filter unit 220) may be configured to output loop filter parameters (such as sample adaptive offset information), e.g., directly or entropy encoded via the entropy encoding unit 270 or any other entropy coding unit, so that, e.g., a decoder 30 may receive and apply the same loop filter parameters for decoding.

The decoded picture buffer (DPB) 230 may be a reference picture memory that stores reference picture data for use in encoding video data by video encoder 20. The DPB 230 may be formed by any of a variety of memory devices, such as dynamic random access memory (DRAM), including synchronous DRAM (SDRAM), magneto-resistive RAM (MRAM), resistive RAM (RRAM), or other types of memory devices. The DPB 230 and the buffer 216 may be provided by the same memory device or separate memory devices. In some example, the decoded picture buffer (DPB) 230 is configured to store the filtered block 221. The decoded picture buffer 230 may be further configured to store other previously filtered blocks, e.g., previously reconstructed and filtered blocks 221, of the same current picture or of different pictures, e.g., previously reconstructed pictures, and may provide complete previously reconstructed, i.e. decoded, pictures (and corresponding reference blocks and samples) and/or a partially reconstructed current picture (and corresponding reference blocks and samples), for example for inter prediction. In some example, if the reconstructed block 215 is reconstructed but without in-loop filtering, the decoded picture buffer (DPB) 230 is configured to store the reconstructed block 215.

The prediction processing unit 260, also referred to as block prediction processing unit 260, is configured to receive or obtain the block 203 (current block 203 of the current picture 201) and reconstructed picture data, e.g., reference samples of the same (current) picture from buffer 216 and/or reference picture data 231 from one or a plurality of previously decoded pictures from decoded picture buffer 230, and to process such data for prediction, i.e. to provide a prediction block 265, which may be an inter-predicted block 245 or an intra-predicted block 255.

Mode selection unit 262 may be configured to select a prediction mode (e.g., an intra or inter prediction mode) and/or a corresponding prediction block 245 or 255 to be used as prediction block 265 for the calculation of the residual block 205 and for the reconstruction of the reconstructed block 215.

Embodiments of the mode selection unit 262 may be configured to select the prediction mode (e.g., from those supported by prediction processing unit 260), which provides the best match or in other words the minimum residual (minimum residual means better compression for transmission or storage), or a minimum signaling overhead (minimum signaling overhead means better compression for transmission or storage), or which considers or balances both. The mode selection unit 262 may be configured to determine the prediction mode based on rate distortion optimization (RDO), i.e. select the prediction mode which provides a minimum rate distortion optimization or which associated rate distortion at least a fulfills a prediction mode selection criterion.

In the following the prediction processing (e.g., prediction processing unit 260 and mode selection (e.g., by mode selection unit 262) performed by an example encoder 20 will be explained in more detail.

As described above, the encoder 20 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 35 different intra-prediction modes, e.g., non-directional modes like DC (or mean) mode and planar mode, or directional modes, e.g., as defined in H.265, or may comprise 67 different intra-prediction modes, e.g., non-directional modes like DC (or mean) mode and planar mode, or directional modes, e.g., as defined in H.266 under developing.

The set of (or possible) inter-prediction modes depend on the available reference pictures (i.e. previous at least partially decoded pictures, e.g., stored in DBP 230) and other inter-prediction parameters, e.g., whether the whole reference picture or only a part, e.g., a search window area around the area of the current block, of the reference picture is used for searching for a best matching reference block, and/or e.g., whether pixel interpolation is applied, e.g., half/semi-pel and/or quarter-pel interpolation, or not.

Additional to the above prediction modes, skip mode and/or direct mode may be applied.

The prediction processing unit 260 may be further configured to partition the block 203 into smaller block partitions or sub-blocks, e.g., iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes applied to each of the block partitions or sub-blocks.

The inter prediction unit 244 may include motion estimation (ME) unit (not shown in FIG. 2) and motion compensation (MC) unit (not shown in FIG. 2). The motion estimation unit is configured to receive or obtain the picture block 203 (current picture block 203 of the current picture 201) and a decoded picture 231, or at least one or a plurality of previously reconstructed blocks, e.g., reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter prediction parameters to the motion estimation unit (not shown in FIG. 2). This offset is also called motion vector (MV).

The motion compensation unit is configured to obtain, e.g., receive, an inter prediction parameter and to perform inter prediction based on or using the inter prediction parameter to obtain an inter prediction block 245. Motion compensation, performed by motion compensation unit (not shown in FIG. 2), may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block.

Upon receiving the motion vector for the PU of the current picture block, the motion compensation unit 246 may locate the prediction block to which the motion vector points in one of the reference picture lists. Motion compensation unit 246 may also generate syntax elements associated with the blocks and the video slice for use by video decoder 30 in decoding the picture blocks of the video slice.

The intra prediction unit 254 is configured to obtain, e.g., receive, the picture block 203 (current picture block) and one or a plurality of previously reconstructed blocks, e.g., reconstructed neighbor blocks, of the same picture for intra estimation. The encoder 20 may, e.g., be configured to select an intra prediction mode from a plurality of (predetermined) intra prediction modes.

Embodiments of the encoder 20 may be configured to select the intra-prediction mode based on an optimization criterion, e.g., minimum residual (e.g., the intra-prediction mode providing the prediction block 255 most similar to the current picture block 203) or minimum rate distortion.

The intra prediction unit 254 is further configured to determine based on intra prediction parameter, e.g., the selected intra prediction mode, the intra prediction block 255. In any case, after selecting an intra prediction mode for a block, the intra prediction unit 254 is also configured to provide intra prediction parameter, i.e. information indicative of the selected intra prediction mode for the block to the entropy encoding unit 270. In one example, the intra prediction unit 254 may be configured to perform any combination of the intra prediction techniques described later.

The entropy encoding unit 270 is configured to apply an entropy encoding algorithm or scheme (e.g., a variable length coding (VLC) scheme, an context adaptive VLC scheme (CALVC), an arithmetic coding scheme, a context adaptive binary arithmetic coding (CABAC), syntax-based context-adaptive binary arithmetic coding (SBAC), probability interval partitioning entropy (PIPE) coding or another entropy encoding methodology or technique) on the quantized residual coefficients 209, inter prediction parameters, intra prediction parameter, and/or loop filter parameters, individually or jointly (or not at all) to obtain encoded picture data 21 which can be output by the output 272, e.g., in the form of an encoded bitstream 21. The encoded bitstream 21 may be transmitted to video decoder 30, or archived for later transmission or retrieval by video decoder 30. The entropy encoding unit 270 can be further configured to entropy encode the other syntax elements for the current video slice being coded.

Other structural variations of the video encoder 20 can be used to encode the video stream. For example, a non-transform based encoder 20 can quantize the residual signal directly without the transform processing unit 206 for certain blocks or frames. In another embodiment, an encoder 20 can have the quantization unit 208 and the inverse quantization unit 210 combined into a single unit.

FIG. 3 shows an exemplary video decoder 30 that is configured to implement the techniques of this present application. The video decoder 30 configured to receive encoded picture data (e.g., encoded bitstream) 21, e.g., encoded by encoder 100, to obtain a decoded picture 131. During the decoding process, video decoder 30 receives video data, e.g., an encoded video bitstream that represents picture blocks of an encoded video slice and associated syntax elements, from video encoder 100.

In the example of FIG. 3, the decoder 30 comprises an entropy decoding unit 304, an inverse quantization unit 310, an inverse transform processing unit 312, a reconstruction unit 314 (e.g., a summer 314), a buffer 316, a loop filter 320, a decoded picture buffer 330 and a prediction processing unit 360. The prediction processing unit 360 may include an inter prediction unit 344, an intra prediction unit 354, and a mode selection unit 362. Video decoder 30 may, in some examples, perform a decoding pass generally reciprocal to the encoding pass described with respect to video encoder 100 from FIG. 2.

The entropy decoding unit 304 is configured to perform entropy decoding to the encoded picture data 21 to obtain, e.g., quantized coefficients 309 and/or decoded coding parameters (not shown in FIG. 3), e.g., (decoded) any or all of inter prediction parameters, intra prediction parameter, loop filter parameters, and/or other syntax elements. Entropy decoding unit 304 is further configured to forward inter prediction parameters, intra prediction parameter and/or other syntax elements to the prediction processing unit 360. Video decoder 30 may receive the syntax elements at the video slice level and/or the video block level.

The inverse quantization unit 310 may be identical in function to the inverse quantization unit 110, the inverse transform processing unit 312 may be identical in function to the inverse transform processing unit 112, the reconstruction unit 314 may be identical in function reconstruction unit 114, the buffer 316 may be identical in function to the buffer 116, the loop filter 320 may be identical in function to the loop filter 120, and the decoded picture buffer 330 may be identical in function to the decoded picture buffer 130.

The prediction processing unit 360 may comprise an inter prediction unit 344 and an intra prediction unit 354, wherein the inter prediction unit 344 may be functionally similar to the inter prediction unit 144 in function, and the intra prediction unit 354 may be functionally similar to the intra prediction unit 154. The prediction processing unit 360 are typically configured to perform the block prediction and/or obtain the prediction block 365 from the encoded data 21 and to receive or obtain (explicitly or implicitly) the prediction related parameters and/or the information about the selected prediction mode, e.g., from the entropy decoding unit 304.

When the video slice is coded as an intra coded (I) slice, intra prediction unit 354 of prediction processing unit 360 is configured to generate prediction block 365 for a picture block of the current video slice based on a signaled intra prediction mode and data from previously decoded blocks of the current frame or picture. When the video frame is coded as an inter coded (i.e., B, or P) slice, inter prediction unit 344 (e.g., motion compensation unit) of prediction processing unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Prediction processing unit 360 is configured to determine prediction information for a video block of the current video slice by parsing the motion vectors and other syntax elements, and uses the prediction information to produce the prediction blocks for the current video block being decoded. For example, the prediction processing unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Inverse quantization unit 310 is configured to inverse quantize, i.e., de-quantize, the quantized transform coefficients provided in the bitstream and decoded by entropy decoding unit 304. The inverse quantization process may include use of a quantization parameter calculated by video encoder 100 for each video block in the video slice to determine a degree of quantization and, likewise, a degree of inverse quantization that should be applied.

Inverse transform processing unit 312 is configured to apply an inverse transform, e.g., an inverse DCT, an inverse integer transform, or a conceptually similar inverse transform process, to the transform coefficients in order to produce residual blocks in the pixel domain.

The reconstruction unit 314 (e.g., Summer 314) is configured to add the inverse transform block 313 (i.e. reconstructed residual block 313) to the prediction block 365 to obtain a reconstructed block 315 in the sample domain, e.g., by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g., to smooth pixel transitions, or otherwise improve the video quality. In one example, the loop filter unit 320 may be configured to perform any combination of the filtering techniques described later. The loop filter unit 320 is intended to represent one or more loop filters such as a de-blocking filter, a sample-adaptive offset (SAO) filter or other filters, e.g., a bilateral filter or an adaptive loop filter (ALF) or a sharpening or smoothing filters or collaborative filters. Although the loop filter unit 320 is shown in FIG. 3 as being an in loop filter, in other configurations, the loop filter unit 320 may be implemented as a post loop filter.

The decoded video blocks 321 in a given frame or picture are then stored in decoded picture buffer 330, which stores reference pictures used for subsequent motion compensation.

The decoder 30 is configured to output the decoded picture 331, e.g., via output 332, for presentation or viewing to a user.

Other variations of the video decoder 30 can be used to decode the compressed bitstream. For example, the decoder 30 can produce the output video stream without the loop filtering unit 320. For example, a non-transform based decoder 30 can inverse-quantize the residual signal directly without the inverse-transform processing unit 312 for certain blocks or frames. In another embodiment, the video decoder 30 can have the inverse-quantization unit 310 and the inverse-transform processing unit 312 combined into a single unit.

Figure 4:
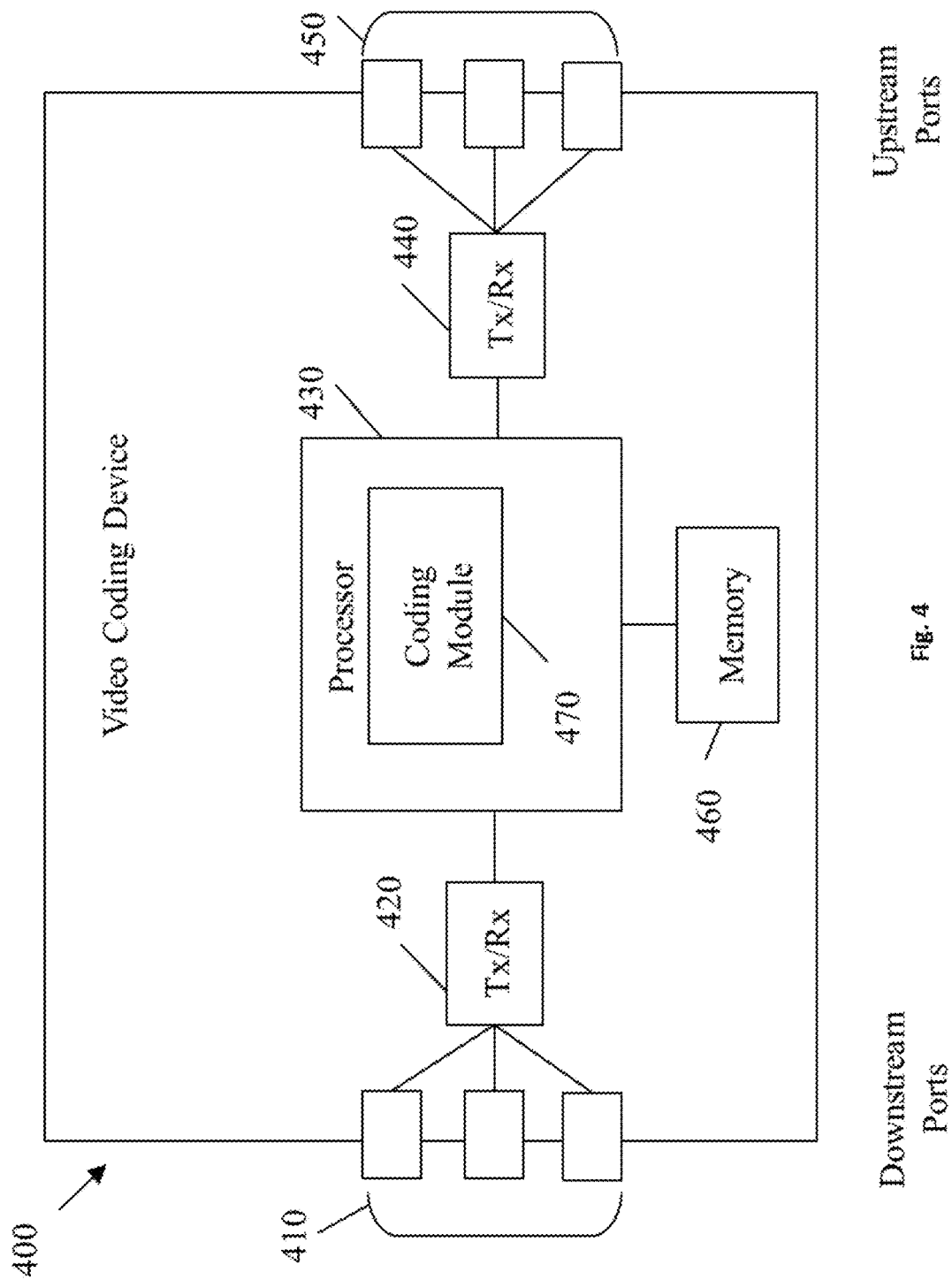
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A. In an embodiment, the video coding device 400 may be one or more components of the video decoder 30 of FIG. 1A or the video encoder 20 of FIG. 1A as described above.

The video coding device 400 comprises ingress ports 410 and receiver units (Rx) 420 for receiving data; a processor, logic unit, or central processing unit (CPU) 430 to process the data; transmitter units (Tx) 440 and egress ports 450 for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 comprises one or more disks, tape drives, and solid-state drives and may be used as an overflow data storage device, to store programs when such programs are selected for execution, and to store instructions and data that are read during program execution. The memory 460 may be volatile and/or non-volatile and may be read-only memory (ROM), random access memory (RAM), ternary content-addressable memory (TCAM), and/or static random-access memory (SRAM).

Figure 5:
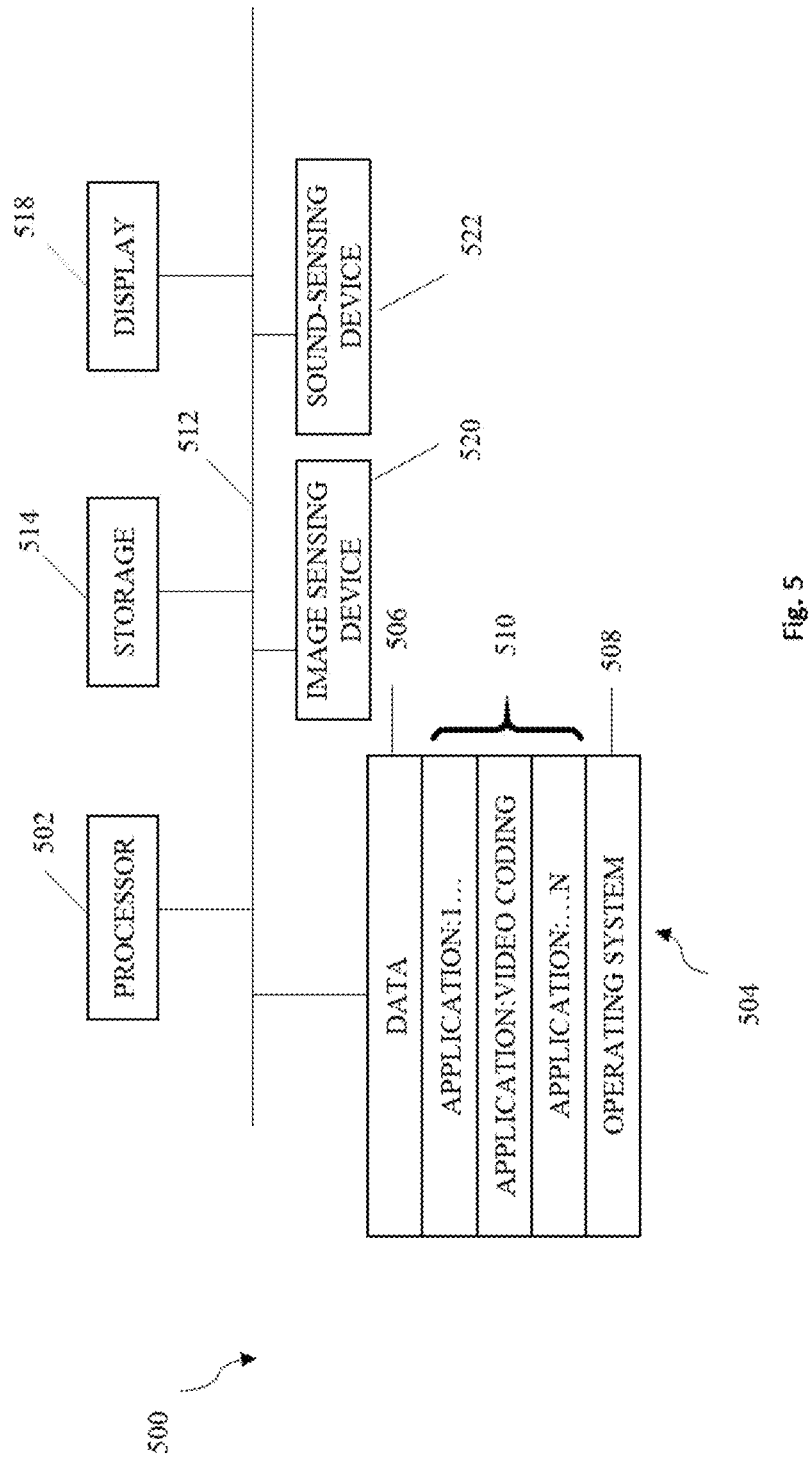
FIG. 5 is a block diagram illustrating another example of an encoding apparatus or a decoding apparatus.

FIG. 5 is a simplified block diagram of an apparatus 500 that may be used as either or both of the source device 310 and the destination device 320 from FIG. 1 according to an exemplary embodiment. The apparatus 500 can implement techniques of this present application described above. The apparatus 500 can be in the form of a computing system including multiple computing devices, or in the form of a single computing device, for example, a mobile phone, a tablet computer, a laptop computer, a notebook computer, a desktop computer, and the like.

A processor 502 in the apparatus 500 can be a central processing unit. Alternatively, the processor 502 can be any other type of device, or multiple devices, capable of manipulating or processing information now-existing or hereafter developed. Although the disclosed embodiments can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an embodiment. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here. The apparatus 500 can also include additional memory in the form of a secondary storage 514, which can, for example, be a memory card used with a mobile computing device. Because the video communication sessions may contain a significant amount of information, they can be stored in whole or in part in the secondary storage 514 and loaded into the memory 504 as needed for processing.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512. Other output devices that permit a user to program or otherwise use the apparatus 500 can be provided in addition to or as an alternative to the display 518. When the output device is or includes a display, the display can be implemented in various ways, including by a liquid crystal display (LCD), a cathode-ray tube (CRT) display, a plasma display or light emitting diode (LED) display, such as an organic LED (OLED) display.

The apparatus 500 can also include or be in communication with an image-sensing device 520, for example a camera, or any other image-sensing device 520 now existing or hereafter developed that can sense an image such as the image of a user operating the apparatus 500. The image-sensing device 520 can be positioned such that it is directed toward the user operating the apparatus 500. In an example, the position and optical axis of the image-sensing device 520 can be configured such that the field of vision includes an area that is directly adjacent to the display 518 and from which the display 518 is visible.

The apparatus 500 can also include or be in communication with a sound-sensing device 522, for example a microphone, or any other sound-sensing device now existing or hereafter developed that can sense sounds near the apparatus 500. The sound-sensing device 522 can be positioned such that it is directed toward the user operating the apparatus 500 and can be configured to receive sounds, for example, speech or other utterances, made by the user while the user operates the apparatus 500.

Although FIG. 5 depicts the processor 502 and the memory 504 of the apparatus 500 as being integrated into a single unit, other configurations can be utilized. The operations of the processor 502 can be distributed across multiple machines (each machine having one or more of processors) that can be coupled directly or across a local area or other network. The memory 504 can be distributed across multiple machines such as a network-based memory or memory in multiple machines performing the operations of the apparatus 500. Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

1. Basic Information on Motion Vector Coding

An important part of inter-prediction in H.265/HEVC standard is motion vector (MV) coding. Motion vectors are usually predictively coded, e.g., by the following two schemes:

1. A motion vector is constructed from a motion vector predictor and a difference between motion vectors is obtained by a motion estimation process and the predictor. This MV coding method in HEVC standard is called advanced motion vector prediction (AMVP).
2. A motion vector is derived by selection from a configurable set of candidates (predictors), without encoding a motion vector difference. This approach is called merge mode.

Figure 6:
FIG. 6 schematically illustrates an example of a block, e.g., a CU, along with the positions of some adjoining blocks.

For both techniques, a large set of potential prediction candidates constructed from already encoded motion vectors can be accounted. In HEVC standard, there are four groups of motion vector predictors: spatial, temporal, combined Bi-predictive, and zero candidates. During the encoding process, the best motion vector predictor is selected from an amount of candidates and its index in the candidates list is written to the bitstream. An example of locations for spatial MVP candidates (for merge mode) is shown in FIG. 6.

In the given example, MVP candidates are denoted as $A_0$, $A_1$, $B_0$, $B_1$, and $B_2$, respectively. The locations of $A_i$ candidates indicate the predictors to the left and the locations of $B_j$ indicate the predictors at the top of the current CU. It should be noted that in the general case the candidate locations may depend on the CU's coding order. Depending on the coding order, the candidates may be selected from the top, left, right, and bottom adjacent CUs.

All of the spatial MVP candidates (for merge mode and for advanced motion vector prediction) in HEVC standard belong to the adjacent neighboring CUs (meaning they share a border with the current CU).

History-Based Motion Vector Prediction

For further improvement of the motion vector prediction, techniques using the motion information (motion information is the set of merge list indices, reference picture index/indexes and motion vector/vectors) from non-adjustment CUs were proposed.

One of such techniques is the History-based motion vector prediction (HMVP), described by Li Zhang, et al., "CE4-related: History-based Motion Vector Prediction", Joint Video Exploration Team (JVET) of ITU-T SG 16 WP 3 and ISO/IEC JTC1/SC 29/WG 11 JVET-K0104, 11th meeting, Ljubljana, SI, 10-18 Jul. 2018. HMVP uses a look-up table (LUT) comprised of motion information from previously coded CUs. Basically, the HMVP method consists of two main parts:
  1. HMVP LUT construction and updating method
  2. HMVP LUT usage for constructing merge candidate list (or AMVP candidate list).

1.1 HMVP LUT Construction and Updating Method

A LUT is maintained during the encoding and decoding processes. The LUT is emptied when a new slice is encountered. Whenever the current CU is inter-coded, the associated motion information is added to the last entry of the table as a new HMVP candidate. The LUT size (denoted as N) is a parameter in the HMVP method.

If the number of HMVP candidates from the previously coded CUs is more than the LUT size, a table update method is applied, so that the LUT always contains no more than N latest previously coded motion candidates. In the approach of Zhang et al., two table update methods are proposed:
  1. First-In-First-Out (FIFO)
  2. Constrained FIFO.

1.1.1 FIFO LUT Updating Method

Figure 7:
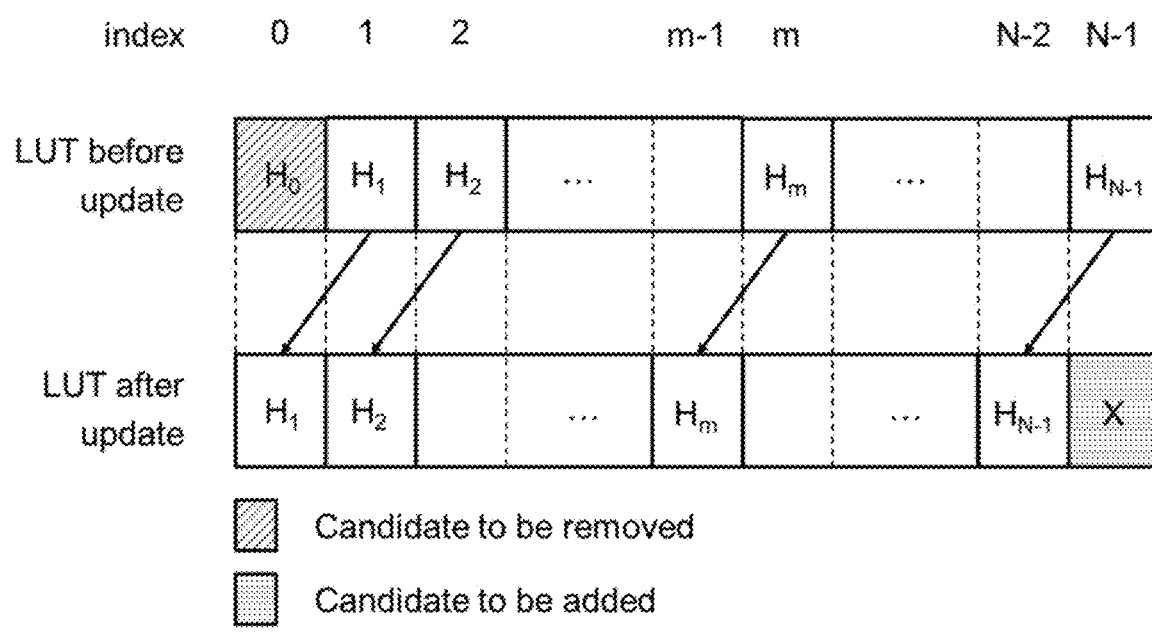
FIG. 7 to 9 schematically illustrate examples of embodiments.

According to the FIFO LUT updating method, before inserting the new candidate, the oldest candidate (0-th table entry) is removed from the table. This process is illustrated in FIG. 7. In the example shown in FIG. 7, $H_0$ is the oldest (0-th) HMVP candidate and X is the new one.

This updating method has a relatively small complexity, but some of the LUT elements may be the same (contain the same motion information) wherein this method is applied. This means that some data in the LUT is redundant and motion information diversity in the LUT is worse than in the case where duplicated, i.e. redundant candidates were actually erased.

1.1.2 Constraint FIFO LUT Updating Method

To further improve the coding efficiency, a constraint FIFO LUT updating method is introduced. According to this method, a redundancy check is firstly applied before inserting a new HMVP candidate to the table. Redundancy check means finding whether motion information from the new candidate X coincides with the motion information from candidate $H_m$ already located in the LUT. If such a candidate $H_m$ is not found, a simple FIFO method is used, otherwise the following procedure is performed:
  1. All LUT entries after $H_m$ are moved one position to the left (to the beginning of table), so that candidate $H_m$ is removed from the table and one position at the end of LUT is released.
  2. A new candidate X is added to the first empty position of the table.

Figure 8:
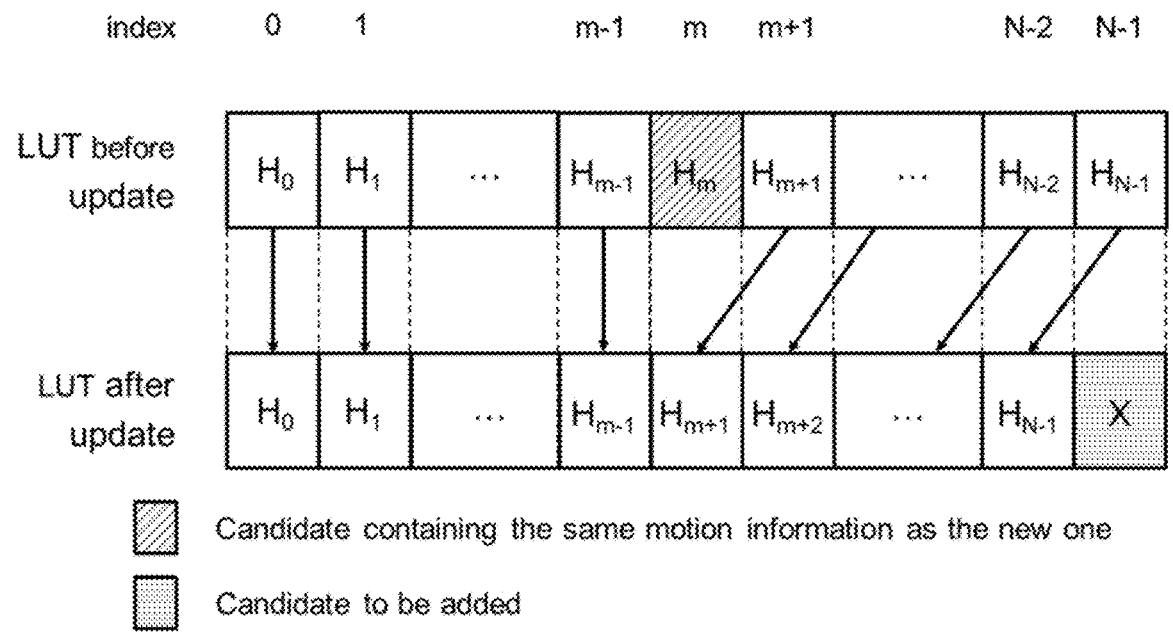

An example of using constraint FIFO LUT updating method is depicted in FIG. 8.

1.2 Motion Vector Coding Using HMVP LUT

HMVP candidates can be used in the merge candidate list construction process and/or in AMVP candidate list construction process.

1.2.1 Merge Candidate List Construction Using HMVP LUT

Figure 9:
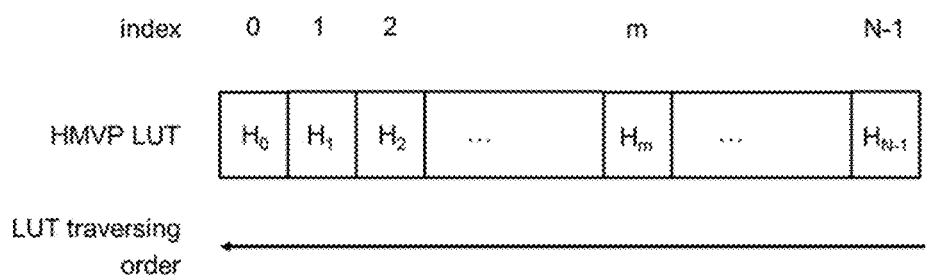

According to Zhang et al., HMVP candidates are inserted to the merge list from the last entry to the first entry ($H_{N-1}$, $H_{N-2}$, . . . , $H_0$) after the TMVP candidate. The LUT traversing order is depicted in FIG. 9. If a HMVP candidate is equal to one of the candidates already present in the merge list, the HMVP candidate is not added to the list. Since the merge list size is limited, some of the HMVP candidates, located at the beginning of the LUT, may also not be used in the merge list construction process for the current CU.

1.2.2 AMVP Candidate List Construction Process Using HMVP LUT

In the approach of Zhang et al., a HMVP LUT, that is constructed for merge mode, is also used for AMVP. The difference to its use in the merge mode is that only a few entries from this LUT are used for the AMVP candidate list construction. More specifically, the last M elements are used (Zhang et al. use M equal to 4). During the AMVP candidate list construction process, HMVP candidates are inserted to the list after the TMVP candidate from the last to the (N−K)-th entry ($H_{N-1}$, $H_{N-2}$, . . . , $H_{N-K}$). The LUT traversing order is depicted in FIG. 9.

Only HMVP candidates with the same reference picture as the AMVP target reference picture are used. If the HMVP candidate is equal to one of the candidates already present in the list, the HMVP candidate is not used for AMVP candidate list construction. Since the AMVP candidate list size is limited, some of the HMVP candidates may not be used in the AMVP list construction process for the current CU.

1.3 Disadvantages of the HMVP Method

In HEVC and VVC, the merge list construction process begins with the analysis of motion information from adjacent CUs, as depicted in FIG. 6. Candidates from the HMVP LUT are inserted after adjacent candidates and TMVP candidates. In spite of this, the HMVP LUT construction method is designed such that the last entries in the HMVP LUT contain also motion information from the adjacent CUs in most cases. As a result, unnecessary candidate comparison operations are performed without adding new elements to the candidate list. The same problem exists when the HMVP LUT is used for the AMVP candidate list construction process, because the AMVP list construction process begins also with the analysis of motion information from adjacent CUs.

2. Generalized Bi-Prediction

Generalized bi-prediction (GBi) was proposed by C.-C. Chen, X. Xiu, Y. He and Y. Ye, "Generalized bi-prediction for inter coding," Joint Video Exploration Team of ITU-T SG16 WP3 and ISO/IEC JTC1/SC29/WG11, JVET-C0047, May 2016. GBi applies unequal weights to predictors from list 0 and list 1 in bi-prediction mode. In the inter-prediction mode, multiple weight pairs including the equal weight pair (½, ½) are evaluated based on rate-distortion optimization, and the GBi index of the selected weight pair is signaled to the decoder.

In merge mode, the GBi index is inherited from a neighboring CU. The predictor generation in bi-prediction mode is shown in Equation (1).

$$P_{GBi}=(w_0 * P_{L0} + w_1 * P_{L1} + \text{RoundingOffset}_{GBi}) >> \text{shiftNum}_{GBi}, \quad (1)$$

where $P_{GBi}$ is the final predictor of GBi. $w_0$ and $w_1$ are the selected GBi weight pair and applied to the predictors of list 0 (L0) and list 1 (L1), respectively. $\text{RoundingOffset}_{GBi}$ and $\text{shiftNum}_{GBi}$ are used to normalize the final predictor in GBi. The supported $w_1$ weight set is $\{-¼, ⅜, ½, ⅝, 5/4\}$, in which the five weights correspond to one equal weight pair and four unequal weight pairs. The sum of $w_1$ and $w_0$ is fixed to 1.0. Therefore, the corresponding $w_0$ weight set is $\{5/4, ⅝, ½, ⅜, -¼\}$. The weight pair selection is at CU-level.

For non-low delay pictures, the weight set size is reduced from five to three, where the $w_1$ weight set is $\{⅜, ½, ⅝\}$ and the $w_0$ weight set is $\{⅝, ½, ⅜\}$.

It is an object of the present disclosure to reduce the merge/AMVP candidate list construction complexity, and to avoid unneeded comparison operations.

Embodiments of the present disclosure relates to a generalized bi-prediction method and apparatus of an inter-prediction apparatus. More specifically, the following aspects are described:
1. A history-based motion information list construction modification: in addition to motion information of a current block, a generalized bi-prediction weight index (bcwIdx index) of the current block is stored in the list.
2. A bcwIdx index derivation procedure modification: for merge mode: for blocks having a merge index corresponding to a history-based candidate, the bcwIdx index of this candidate is used for the current block.

According to an embodiment of the present disclosure, a method is provided for determining motion information for a current block of a frame based on a history-based motion vector predictor, HMVP, list, comprising the operations: constructing the HMVP list, which is an ordered list of N history-based candidates $H_k$, k=0, . . . , N−1, associated with motion information of N preceding blocks of the frame preceding the current block, wherein N is greater than or equal to 1, wherein each history-based candidate comprises motion information including elements: i) one or more motion vectors, MVs, ii) one or more reference picture indices corresponding to the MVs, and iii) one or more bi-prediction weight indices; adding one or more history-based candidates from the HMVP list into a motion information candidate list for the current block; and deriving the motion information based on the motion information candidate list.

Figure 10:
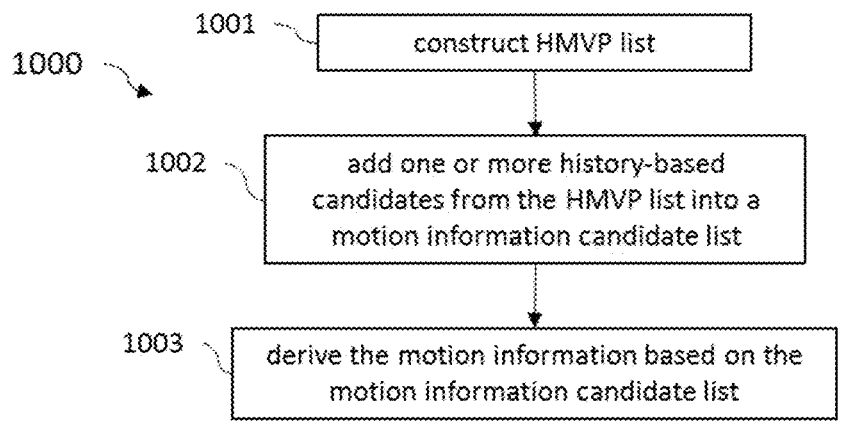
FIG. 10 is a flowchart of the motion information determining method.

FIG. 10 shows a flowchart 1000 of the method for determining motion information. In operation 1001, a HMVP list is constructed. In operation 1002, one or more history-based candidates from the HMVP list are added into a motion information candidate list. In operation 1003, the motion information based on the motion information candidate list is derived.

According to an embodiment of the present disclosure, a history-based candidate includes further one or more indices, different from the one or more bi-prediction weight indices.

According to an embodiment of the present disclosure, the constructing of the HMVP list further comprises: comparing at least one of the elements of each history-based candidate of the HMVP list with the corresponding element of the preceding block; and adding the motion information of the preceding block to the HMVP list, if as a result of the comparing at least one of the elements of each history-based candidate of the HMVP list differs from the corresponding element of the preceding block.

According to an embodiment of the present disclosure, the method further comprises: comparing at least one of the elements of each history-based candidate of the HMVP list with the corresponding element of the motion information for the current block; and adding the motion information of the current block to the HMVP list, if as a result of the comparing at least one of the elements of each HMVP candidate of the HMVP list differs from the corresponding element of the motion information of the current block.

According to an embodiment of the present disclosure, the comparing comprises: comparing the corresponding motion vectors, and comparing the corresponding reference picture indices.

According to an embodiment of the present disclosure, the comparing comprises: comparing the corresponding motion vectors, comparing the corresponding reference picture indices, and comparing the bi-prediction weight indices.

As mentioned before, the comparison is performed element-by-element. In particular, the comparison may include all elements of the motion information. Alternatively, some of the elements may be used in the comparison. In other words, a subset of elements of the motion information may be used for the comparison, in view of the motion information comprising i) one or more MVs, ii), one or more reference picture indices, iii) a bi-prediction weight index. Also, said motion information may entail iv) one or more indices different from the bcw index.

For example, a subset of elements of the motion information may include the above MVs and the reference picture indices. The comparison would then be performed only on checking differences with respect to the MVs and the reference picture indices, irrespective of whether or not the other elements (not part of the subset) are the same. In the given subset example, these elements excluded from the comparison would be the bcw index and the one or more other indices different from the bcw index.

In a second example, the subset may include as elements of the motion information the MVs, the reference picture indices, and the bi-prediction index. The one or more other indices different from the bcw index are excluded from this subset. In this case, the comparison is performed in terms of checking differences with respect to these three types of elements.

Hence, while the motion information may entail multiple elements, the comparison may be performed element-wise based on a subset of elements from said motion information.

According to an embodiment of the present disclosure, the history-based candidates of the HMVP list are ordered in an order in which the history-based candidates of the preceding blocks are obtained from a bit stream.

According to an embodiment of the present disclosure, the HMVP list has a length of N, and N is 6 or 5.

According to an embodiment of the present disclosure, the motion information candidate list includes: a first motion information from motion information of a first block, wherein the first block has a preset spatial or temporal position relationship with the current block.

According to an embodiment of the present disclosure, the deriving the motion information based on the motion information candidate list comprises: deriving the motion information by referring to a merge index from a bit stream as the current block is coded in a merge mode, or to a motion vector predictor index from the bit stream as the current block is coded in an advanced motion vector prediction, AMVP, mode.

According to an embodiment of the present disclosure, further included is obtaining a prediction value of the current block by using a bi-prediction weight index included in the motion information derived based on the motion information candidate list.

The modified bcwIdx index derivation method may provide an advantage of improving the coding efficiency by use of a more appropriate bcwIdx index for a CUs, coded in merge mode and having a merge index corresponding to history-based merge candidates.

1. Modified Updating Process for the Table with HMVP Motion Candidates

The proposed HMVP table updating logic is the same as in the conventional method. The difference is that a motion candidate (mvCand), which is the input for HMVP table updating process, in addition to two motion vectors, two reference indices and two prediction list utilization flags contains also generalized bi-prediction weight index. This bcwIdx index is stored in the HMVP table and can affect pruning procedure in HMVP table updating process (calculation of variable sameCand in description below).

According to an embodiment of the present disclosure, a method is provided for constructing and updating a history-based motion vector predictor, HMVP, list, comprising the operations: constructing the HMVP list, which is an ordered list of N history-based candidates $H_k$, k=0, ..., N−1, associated with motion information of N preceding blocks of the frame preceding the current block, wherein N is greater than or equal to 1, wherein each history-based candidate comprises motion information including elements: i) one or more motion vectors, MVs, ii) one or more reference picture indices corresponding to the MVs, and iii) one or more bi-prediction weight indices; comparing at least one of the elements of each history-based candidate of the HMVP list with the corresponding element of the current block; and adding the motion information of the current block to the HMVP list, if as a result of the comparing at least one of the elements of each of the history-based candidate of the HMVP list differs from the corresponding element of the current block.

Figure 11:
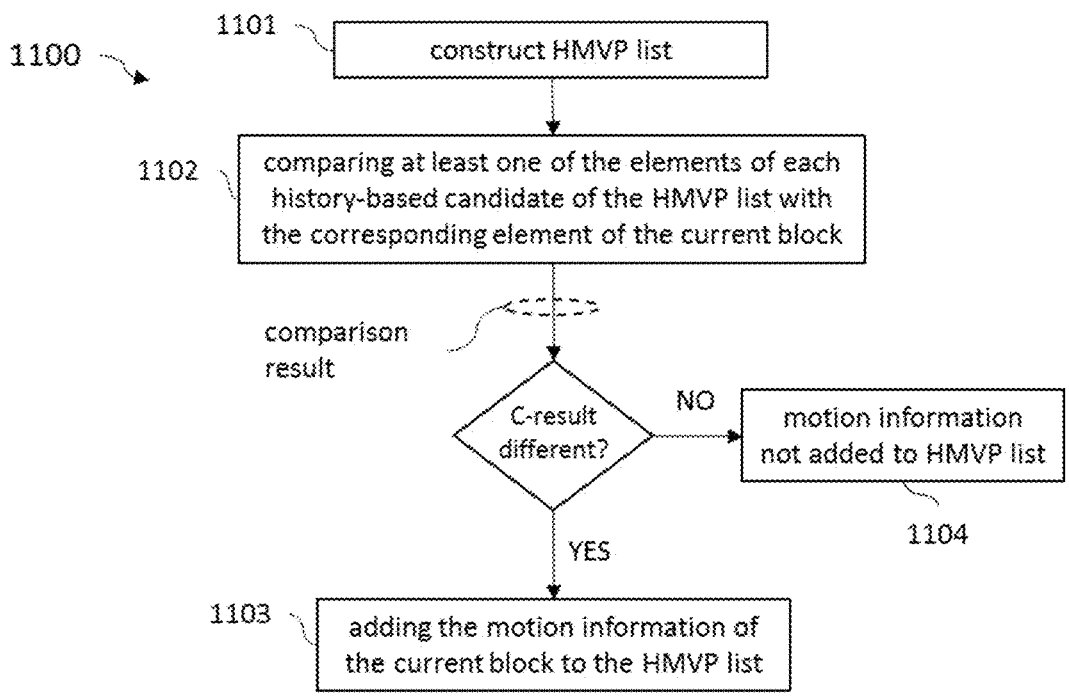
FIG. 11 is a flowchart of the HMVP list updating method.

FIG. 11 shows a flowchart 1100 of the method for constructing and updating a history-based motion vector predictor. In operation 1101, a HMVP list is constructed. In operation 1102, at least one of the elements of each history-based candidate of the HMVP list are compared with the corresponding element of the current block.

The result of the element-based comparison is referred to as C-result in FIG. 11. The C-result may be that all elements are the same/equal or at least one or more elements are not the same/unequal/different.

If the C-result is that at least one or more elements are different, the motion information of the current block is added to the HMVP list (operation 1103). Otherwise, if all elements are the same, the respective motion information is not added to the HMVP list (operation 1104).

According to an embodiment of the present disclosure, a history-based candidate includes further one or more indices, different from the one or more bi-prediction weight indices.

According to an embodiment of the present disclosure, the comparing comprises: comparing the corresponding motion vectors, and comparing the corresponding reference picture indices.

According to an embodiment of the present disclosure, the comparing comprises: comparing the corresponding motion vectors, comparing the corresponding reference picture indices, and comparing the bi-prediction weight indices.

According to an embodiment of the present disclosure, the history-based candidates of the HMVP list are ordered in an order in which the history-based candidates of the preceding blocks are obtained from a bit stream.

According to an embodiment of the present disclosure, the HMVP list has a length of N, and N is 6 or 5.

Inputs to HMVP table updating process are:
  A motion candidate mvCand with two motion vectors mvL0 and mvL1, two reference indices refIdxL0 and refIdxL1, two variable prediction list utilization flags predFlagL0 and predFlagL1 and the generalized bi-prediction weight index bcwIdx.

Output of this process is a modified HMVP array HMVP-CandList.

The updating process consists of the following ordered operations:
  1. For each index HMVPIdx with HMVPIdx=0 ... HMVPCandNum−1, the following operations apply in order until variable sameCand is equal to true:
     1.1 if mvCand has the same motion vectors, the same reference indices and the same GBi indices as HMVPCandList[HMVPIdx], the variable sameCand is set to true.
     1.2 Otherwise, the variable sameCand is set to false.
     1.3 HMVPIdx++
  2. Variable tempIdx is set to HMVPCandNum.
  3. If sameCand is equal to true or HMVPCandNum equal to 6, for each index tempIdx with tempIdx=(sameCand?HMVPIdx:1) ... HMVPCandNum−1, copy HMVPCandList[tempIdx] to HMVPCandList[tempIdx−1]
  4. Copy mvCand to HMVPCandList[tempIdx]
  5. If HMVPCandNum is smaller than 6, HMVPCandNum is increased by 1.

In some embodiments, sameCand variable calculation (operations 1, 0 of algorithm description above) can be as following:
  1.1 if mvCand have the same motion vectors, the same reference indices as HMVPCandList[HMVPIdx], the variable sameCand is set to true.
  1.2 Otherwise, the variable sameCand is set to false.

In some embodiments, sameCand variable calculation can depends on difference between GBi indices of mvCand and HMVPCandList[HMVPIdx].

In some embodiments, sameCand variable calculation can depends on exact values of bcwIdx indices of mvCand and HMVPCandList[HMVPIdx]. For example, some pairs of bcwIdx indices can be considered as equal within the context of HMVP table updating process.

2. Modified Derivation Process for HMVP Merging Candidates

The difference between the proposed and conventional derivation process for HMVP merging candidates is that bcwIdx indices are also derived by the proposed process. These bcwIdx indices are stored in the HMVP table and can affect the pruning procedure in the HMVP merging candidates derivation process.

Inputs to HMVP merging candidates derivation process are:
- a merging candidate list mergeCandList,
- the reference indices refIdxL0N and refIdxL1N of every candidate N in mergeCandList,
- the prediction list utilization flags predFlagL0N and predFlagL1N of every candidate N in mergeCandList,
- the motion vectors in 1/16 fractional-sample accuracy mvL0N and mvL1N of every candidate N in mergeCandList,
- the number of elements numCurrMergeCand within mergeCandList,
- the number of elements numOrigMergeCand within the mergeCandList after the spatial and temporal merge candidate derivation process,
- HMVP list HMVPCandList, composed of HMVPCandNum elements,
- Maximum number of merge candidates MaxNumMergeCand,
- the generalized bi-prediction weight indices bcwIdx of every candidate in mergeCandList.

Outputs of HMVP merging candidates derivation process are:
- the merging candidate list mergeCandList,
- the number of elements numCurrMergeCand within mergeCandList,
- the reference indices refIdxL0combCandk and refIdxL1combCandk of every new candidate combCandk added into mergeCandList during the invocation of this process,
- the prediction list utilization flags predFlagL0combCandk and predFlagL1combCandk of every new candidate combCandk added into mergeCandList during the invocation of this process,
- the motion vectors in 1/16 fractional-sample accuracy mvL0combCandk and mvL1combCandk of every new candidate combCandk added into mergeCandList during the invocation of this process,
- the generalized bi-prediction weight indices mvL0combCandk of every new candidate combCandk added into mergeCandList during the invocation of this process.

1. The variable numOrigMergeCand is set equal to numCurrMergeCand, the variable hmvpStop is set equal to FALSE
2. For each candidate in HMVPCandList with index HMVPIdx=1 . . . HMVPCandNum, the following ordered operations are repeated until hmvpStop is equal to TRUE:
   2.1 sameMotion is set to FALSE
   2.2 If HMVPCandList[HMVPCandNum−HMVPIdx] have the same motion vectors, the same reference indices and the same bcwIdx index with any mergeCandList[i] with i being 0 . . . numOrigMergeCand −1, sameMotion is set to TRUE
   2.3 If sameMotion is equal to false, mergeCandList[numCurrMergeCand++] is set to HMVPCandList[HMVPCandNum−HMVPIdx]
   2.4 If numCurrMergeCand is equal to (MaxNumMergeCand−1), hmvpStop is set to TRUE.

In some embodiments, sameMotion variable calculation (operation 0 of algorithm description above) can be as follows:

2.2. If HMVPCandList[HMVPCandNum−HMVPIdx] have the same motion vectors, the same reference indices with any mergeCandList[i] with i being 0 . . . numOrigMergeCand−1, sameMotion is set to TRUE In some embodiments, sameMotion variable calculation can depends on the difference between GBi indices of HMVPCandList[HMVPCandNum−HMVPIdx] and mergeCandList[i].

In some embodiments, sameMotion variable calculation can depends on the exact values of bcwIdx indices of HMVPCandList[HMVPCandNum−HMVPIdx] and mergeCandList[i]. For example, some pairs of bcwIdx indices can be considered as equal in context of HMVP merging candidates derivation process.

An example of detail embodiment of processing HMVP merge candidates is descripted below:

8.5.2 Derivation process for motion vector components and reference indices 8.5.2.1 General Inputs to this process are:
- a luma location (xCb, yCb) of the top-left sample of the current luma coding block relative to the top-left luma sample of the current picture,
- a variable cbWidth specifying the width of the current coding block in luma samples,
- a variable cbHeight specifying the height of the current coding block in luma samples.

Outputs of this process are:
- the luma motion vectors in 1/16 fractional-sample accuracy mvL0[0][0] and mvL1[0][0],
- the reference indices refIdxL0 and refIdxL1,
- the prediction list utilization flags predFlagL0[0][0] and predFlagL1[0][0],
- the half sample interpolation filter index hpelIfIdx,
- the bi-prediction weight index bcwIdx.

Let the variable LX be RefPicList[X], with X being 0 or 1, of the current picture.

For the derivation of the variables mvL0[0][0] and mvL1[0][0], refIdxL0 and refIdxL1, as well as predFlagL0[0][0] and predFlagL1[0][0], the following applies:

If general_merge_flag[xCb][yCb] is equal to 1, the derivation process for luma motion vectors for merge mode as specified in clause 8.5.2.2 is invoked with the luma location (xCb, yCb), the variables cbWidth and cbHeight inputs, and the output being the luma motion vectors mvL0[0][0], mvL1[0][0], the reference indices refIdxL0, refIdxL1, the prediction list utilization flags predFlagL0[0][0] and predFlagL1[0][0], the half sample interpolation filter index hpelIfIdx, the bi-prediction weight index bcwIdx and the merging candidate list mergeCandList.

Otherwise, the following applies:
For X being replaced by either 0 or 1 in the variables predFlagLX[0][0], mvLX[0][0] and refIdxLX, in PRED_LX, and in the syntax elements ref_idx_1X and MvdLX, the following ordered operations apply:
1. The variables refIdxLX and predFlagLX[0][0] are derived as follows:
   If inter_pred_idc[xCb][yCb] is equal to PRED_LX or PRED_BI, $$\text{refIdxLX} = \text{ref\_idx\_1}X[xCb][yCb] \quad (8\text{-}292)$$

$$\text{predFlagLX}[0][0] = 1 \quad (8\text{-}293)$$

Otherwise, the variables refIdxLX and predFlagLX[0][0] are specified by:

$$\text{refIdxLX}=-1 \quad (8\text{-}294)$$

$$\text{predFlagLX}[0][0]=0 \quad (8\text{-}295)$$

2. The variable mvdLX is derived as follows:

$$\text{mvdLX}[0]=\text{MvdLX}[xCb][yCb][0] \quad (8\text{-}296)$$

$$\text{mvdLX}[1]=\text{MvdLX}[xCb][yCb][1] \quad (8\text{-}297)$$

3. When predFlagLX[0][0] is equal to 1, the derivation process for luma motion vector prediction in clause 8.5.2.8 is invoked with the luma coding block location (xCb, yCb), the coding block width cbWidth, the coding block height cbHeight and the variable refIdxLX as inputs, and the output being mvpLX.
4. When predFlagLX[0][0] is equal to 1, the luma motion vector mvLX[0][0] is derived as follows:

$$uLX[0]=(\text{mvpLX}[0]+\text{mvdLX}[0]+2^{18})\% \ 2^{18} \quad (8\text{-}298)$$

$$\text{mvLX}[0][0][0]=(uLX[0]>=2^{17})?(uLX[0]-2^{18}):uLX[0] \quad (8\text{-}299)$$

$$uLX[1]=(\text{mvpLX}[1]+\text{mvdLX}[1]+2^{18})\% \ 2^{18} \quad (8\text{-}300)$$

$$\text{mvLX}[0][0][1]=(uLX[1]>=2^{17})?(uLX[1]-2^{18}):uLX[1] \quad (8\text{-}301)$$

NOTE 1—The resulting values of mvLX[0][0][0] and mvLX[0][0][1] as specified above will always be in the range of $-2^{17}$ to $2^{17}-1$, inclusive.

The half sample interpolation filter index hpelIfIdx is derived as follows:

$$\text{hpelIfIdx}=\text{AmvrShift}==3?1:0 \quad (8\text{-}302)$$

The bi-prediction weight index bcwIdx is set equal to bcw_idx[xCb][yCb].

When all of the following conditions are true, refIdxL1 is set equal to −1, predFlagL1 is set equal to 0, and bcwIdx is set equal to 0:
  predFlagL0[0][0] is equal to 1.
  predFlagL1[0][0] is equal to 1.
  The value of (cbWidth+cbHeight) is equal to 12.

The updating process for the history-based motion vector predictor list as specified in clause 8.5.2.16 is invoked with luma motion vectors mvL0[0][0] and mvL1[0][0], reference indices refIdxL0 and refIdxL1, prediction list utilization flags predFlagL0[0][0] and predFlagL1[0][0], bi-prediction weight index, and half sample interpolation filter index hpelIfIdx.

8.5.2.3 Derivation Process for Spatial Merging Candidates

Inputs to this process are:
  a luma location (xCb, yCb) of the top-left sample of the current luma coding block relative to the top-left luma sample of the current picture,
  a variable cbWidth specifying the width of the current coding block in luma samples,
  a variable cbHeight specifying the height of the current coding block in luma samples.

Outputs of this process are as follows, with X being 0 or 1:
  the availability flags availableFlag$A_0$, availableFlag$A_1$, availableFlag$B_0$, availableFlag$B_1$ and availableFlag$B_2$ of the neighbouring coding units,
  the reference indices refIdxLX$A_0$, refIdxLX$A_1$, refIdxLX$B_0$, refIdxLX$B_1$ and refIdxLX$B_2$ of the neighbouring coding units,
  the prediction list utilization flags predFlagLX$A_0$, predFlagLX$A_1$, predFlagLX$B_0$, predFlagLX$B_1$ and predFlagLX$B_2$ of the neighbouring coding units,
  the motion vectors in 1/16 fractional-sample accuracy mvLX$A_0$, mvLX$A_1$, mvLX$B_0$, mvLX$B_1$ and mvLX$B_2$ of the neighbouring coding units,
  the half sample interpolation filter indices hpelIfIdx$A_0$, hpelIfIdx$A_1$, hpelIfIdx$B_0$, hpelIfIdx$B_1$, and hpelIfIdx$B_2$,
  the bi-prediction weight indices bcwIdx$A_0$, bcwIdx$A_1$, bcwIdx$B_0$, bcwIdx$B_1$, and bcwIdx$B_2$.

For the derivation of availableFlag$A_1$, refIdxLX$A_1$, predFlagLX$A_1$ and mvLX$A_1$ the following applies:
  The luma location (xNb$A_1$, yNb$A_1$) inside the neighbouring luma coding block is set equal to (xCb−1, yCb+cbHeight−1).
  The derivation process for neighbouring block availability as specified in clause 6.4.4 is invoked with the current luma location (xCurr, yCurr) set equal to (xCb, yCb), the neighbouring luma location (xNb$A_1$, yNb$A_1$), checkPredModeY set equal to TRUE, and cIdx set equal to 0 as inputs, and the output is assigned to the block availability flag availableA$_1$.
  The variables availableFlag$A_1$, refIdxLX$A_1$, predFlagLX$A_1$ and mvLX$A_1$ are derived as follows:
    If availableA$_1$ is equal to FALSE, availableFlag$A_1$ is set equal to 0, both components of mvLX$A_1$ are set equal to 0, refIdxLX$A_1$ is set equal to −1 and predFlagLX$A_1$ is set equal to 0, with X being 0 or 1, and bcwIdx$A_1$ is set equal to 0.
    Otherwise, availableFlag$A_1$ is set equal to 1 and the following assignments are made:

$$\text{mvLX}A_1=\text{MvLX}[xNbA_1][yNbA_1] \quad (8\text{-}319)$$

$$\text{refIdxLX}A_1=\text{RefIdxLX}[xNbA_1][yNbA_1] \quad (8\text{-}320)$$

$$\text{predFlagLX}A_1=\text{PredFlagLX}[xNbA_1][yNbA_1] \quad (8\text{-}321)$$

$$\text{hpelIfIdx}A_1=\text{HpelIfIdx}[xNbA_1][yNbA_1] \quad (8\text{-}322)$$

$$\text{bcwIdx}A_1=\text{BcwIdx}[xNbA_1][yNbA_1] \quad (8\text{-}323)$$

For the derivation of availableFlag$B_1$, refIdxLX$B_1$, predFlagLX$B_1$ and mvLX$B_1$ the following applies:
  The luma location (xNb$B_1$, yNb$B_1$) inside the neighbouring luma coding block is set equal to (xCb+cbWidth−1, yCb−1).
  The derivation process for neighbouring block availability as specified in clause 6.4.4 is invoked with the current luma location (xCurr, yCurr) set equal to (xCb, yCb). the neighbouring luma location (xNb$B_1$, yNb$B_1$), checkPredModeY set equal to TRUE, and cIdx set equal to 0 as inputs, and the output is assigned to the block availability flag availableB$_1$.
  The variables availableFlag$B_1$, refIdxLX$B_1$, predFlagLX$B_1$ and mvLX$B_1$ are derived as follows:
    If one or more of the following conditions are true, availableFlag$B_1$ is set equal to 0, both components of mvLX$B_1$ are set equal to 0, refIdxLX$B_1$ is set equal to −1 and predFlagLX$B_1$ is set equal to 0, with X being 0 or 1, and bcwIdx$B_1$ is set equal to 0:
      availableB$_1$ is equal to FALSE.
      availableA$_1$ is equal to TRUE and the luma locations (xNb$A_1$, yNb$A_1$) and (xNb$B_1$, yNb$B_1$) have the same motion vectors, the same reference indices, the same bi-prediction weight indices and the same half sample interpolation filter indices.

Otherwise, availableFlag$B_1$ is set equal to 1 and the following assignments are made:

mvLX$B_1$=MvLX[xNb$B_1$][yNb$B_1$]   (8-324)

refIdxLX$B_1$=RefIdxLX[xNb$B_1$][yNb$B_1$]   (8-325)

predFlagLX$B_1$=PredFlagLX[xNb$B_1$][yNb$B_1$]   (8-326)

hpelIfIdx$B_1$=HpelIfIdx[xNb$B_1$][yNb$B_1$]   (8-327)

bcwIdx$B_1$=BcwIdx[xNb$B_1$][yNb$B_1$]   (8-328)

For the derivation of availableFlag$B_0$, refIdxLX$B_0$, predFlagLX$B_0$ and mvLX$B_0$ the following applies:
  The luma location (xNb$B_0$, yNb$B_0$) inside the neighbouring luma coding block is set equal to (xCb+cbWidth, yCb−1).
  The derivation process for neighbouring block availability as specified in clause 6.4.4 is invoked with the current luma location (xCurr, yCurr) set equal to (xCb, yCb), the neighbouring luma location (xNb$B_0$, yNb$B_0$), checkPredModeY set equal to TRUE, and cIdx set equal to 0 as inputs, and the output is assigned to the block availability flag available$B_0$.
  The variables availableFlag$B_0$, refIdxLX$B_0$, predFlagLX$B_0$ and mvLX$B_0$ are derived as follows:
    If one or more of the following conditions are true, availableFlag$B_0$ is set equal to 0, both components of mvLX$B_0$ are set equal to 0, refIdxLX$B_0$ is set equal to −1 and predFlagLX$B_0$ is set equal to 0, with X being 0 or 1, and bcwIdx$B_0$ is set equal to 0:
      available$B_0$ is equal to FALSE.
      available$B_1$ is equal to TRUE and the luma locations (xNb$B_1$, yNb$B_1$) and (xNb$B_0$, yNb$B_0$) have the same motion vectors, the same reference indices, the same bi-prediction weight indices and the same half sample interpolation filter indices.
      available$A_1$ is equal to TRUE, the luma locations (xNb$A_1$, yNb$A_1$) and (xNb$B_0$, yNb$B_0$) have the same motion vectors, the same reference indices, the same bi-prediction weight indices, the same half sample interpolation filter indices and MergeTriangleFlag[xCb][yCb] is equal to 1.
    Otherwise, availableFlag$B_0$ is set equal to 1 and the following assignments are made:

mvLX$B_0$=MvLX[xNb$B_0$][yNb$B_0$]   (8-329)

refIdxLX$B_0$=RefIdxLX[xNb$B_0$][yNb$B_0$]   (8-330)

predFlagLX$B_0$=PredFlagLX[xNb$B_0$][yNb$B_0$]   (8-331)

hpelIfIdx$B_0$=HpelIfIdx[xNb$B_0$][yNb$B_0$]   (8-332)

bcwIdx$B_0$=BcwIdx[xNb$B_0$][yNb$B_0$]   (8-333)

For the derivation of availableFlag$A_0$, refIdxLX$A_0$, predFlagLX$A_0$ and mvLX$A_0$ the following applies:
  The luma location (xNb$A_0$, yNb$A_0$) inside the neighbouring luma coding block is set equal to (xCb−1, yCb+cbWidth).
  The derivation process for neighbouring block availability as specified in clause 6.4.4 is invoked with the current luma location (xCurr, yCurr) set equal to (xCb, yCb). the neighbouring luma location (xNb$A_0$, yNb$A_0$), checkPredModeY set equal to TRUE, and cIdx set equal to 0 as inputs, and the output is assigned to the block availability flag available$A_0$.
  The variables availableFlag$A_0$, refIdxLX$A_0$, predFlagLX$A_0$ and mvLX$A_0$ are derived as follows:
    If one or more of the following conditions are true, availableFlag$A_0$ is set equal to 0, both components of mvLX$A_0$ are set equal to 0, refIdxLX$A_0$ is set equal to −1 and predFlagLX$A_0$ is set equal to 0, with X being 0 or 1, and bcwIdx$A_0$ is set equal to 0:
      available$A_0$ is equal to FALSE.
      available$A_1$ is equal to TRUE and the luma locations (xNb$A_1$, yNb$A_1$) and (xNb$A_0$, yNb$A_0$) have the same motion vectors, the same reference indices, the same bi-prediction weight indices and the same half sample interpolation filter indices.
      available$B_1$ is equal to TRUE, the luma locations (xNb$B_1$, yNb$B_1$) and (xNb$A_0$, yNb$A_0$) have the same motion vectors, the same reference indices, the same bi-prediction weight indices, the same half sample interpolation filter indices and MergeTriangleFlag[xCb][yCb] is equal to 1.
      available$B_0$ is equal to TRUE, the luma locations (xNb$B_0$, yNb$B_0$) and (xNb$A_0$, yNb$A_0$) have the same motion vectors, the same reference indices, the same bi-prediction weight indices, the same half sample interpolation filter indices and MergeTriangleFlag[xCb][yCb] is equal to 1.
    Otherwise, availableFlag$A_0$ is set equal to 1 and the following assignments are made:

mvLX$A_0$=MvLX[xNb$A_0$][yNb$A_0$]   (8-334)

refIdxLX$A_0$=RefIdxLX[xNb$A_0$][yNb$A_0$]   (8-335)

predFlagLX$A_0$=PredFlagLX[xNb$A_0$][yNb$A_0$]   (8-336)

hpelIfIdx$A_0$=HpelIfIdx[xNb$A_0$][yNb$A_0$]   (8-337)

bcwIdx$A_0$=BcwIdx[xNb$A_0$][yNb$A_0$]   (8-338)

For the derivation of availableFlag$B_2$, refIdxLX$B_2$, predFlagLX$B_2$ and mvLX$B_2$ the following applies:
  The luma location (xNb$B_2$, yNb$B_2$) inside the neighbouring luma coding block is set equal to (xCb−1, yCb−1).
  The derivation process for neighbouring block availability as specified in clause 6.4.4 is invoked with the current luma location (xCurr, yCurr) set equal to (xCb, yCb), the neighbouring luma location (xNb$B_2$, yNb$B_2$), checkPredModeY set equal to TRUE, and cIdx set equal to 0 as inputs, and the output is assigned to the block availability flag available$B_2$.
  The variables availableFlag$B_2$, refIdxLX$B_2$, predFlagLX$B_2$ and mvLX$B_2$ are derived as follows:
    If one or more of the following conditions are true, availableFlag$B_2$ is set equal to 0, both components of mvLX$B_2$ are set equal to 0, refIdxLX$B_2$ is set equal to −1 and predFlagLX$B_2$ is set equal to 0, with X being 0 or 1, and bcwIdx$B_2$ is set equal to 0:
      available$B_2$ is equal to FALSE.
      available$A_1$ is equal to TRUE and the luma locations (xNb$A_1$, yNb$A_1$) and (xNb$B_2$, yNb$B_2$) have the same motion vectors, the same reference indices, the same bi-prediction weight indices and the same half sample interpolation filter indices.
      available$B_1$ is equal to TRUE and the luma locations (xNb$B_1$, yNb$B_1$) and (xNb$B_2$, yNb$B_2$) have the same motion vectors, the same reference indices, the same bi-prediction weight indices and the same half sample interpolation filter indices.
      available$B_0$ is equal to TRUE, the luma locations (xNb$B_0$, yNb$B_0$) and (xNb$B_2$, yNb$B_2$) have the same motion vectors, the same reference indices, the same bi-prediction weight indices, the same half sample interpolation filter indices and MergeTriangleFlag[xCb][yCb] is equal to 1.

availableA$_0$ is equal to TRUE, the luma locations (xNbA$_0$, yNbA$_0$) and (xNbB$_2$, yNbB$_2$) have the same motion vectors, the same reference indices, the same bi-prediction weight indices, the same half sample interpolation filter indices and MergeTriangleFlag[xCb][yCb] is equal to 1.

availableFlagA$_0$+availableFlagA$_1$+availableFlagB$_0$+availableFlagB$_1$ is equal to 4 and MergeTriangleFlag[xCb][yCb] is equal to 0.

Otherwise, availableFlagB$_2$ is set equal to 1 and the following assignments are made:

mvLXB$_2$=MvLX[xNbB$_2$][yNbB$_2$] (8-339)

refIdxLXB$_2$=RefIdxLX[xNbB$_2$][yNbB$_2$] (8-340)

predFlagLXB$_2$=PredFlagLX[xNbB$_2$][yNbB$_2$] (8-341)

hpelIfIdxB$_2$=HpelIfIdx[xNbB$_2$][yNbB$_2$] (8-342)

bcwIdxB$_2$=BcwIdx[xNbB$_2$][yNbB$_2$] (8-343)

8.5.2.6 Derivation Process for History-Based Merging Candidates

Inputs to this process are:
a merge candidate list mergeCandList,
the number of available merging candidates in the list numCurrMergeCand.

Outputs to this process are:
the modified merging candidate list mergeCandList,
the modified number of merging candidates in the list numCurrMergeCand.

The variables isPrunedA$_1$ and isPrunedB$_1$ are both set equal to FALSE.

For each candidate in HmvpCandList[hMvpIdx] with index hMvpIdx=1 . . . NumHmvpCand, the following ordered operations are repeated until numCurrMergeCand is equal to MaxNumMergeCand −1:

1. The variable sameMotion is derived as follows:
    If all of the following conditions are true for any merging candidate N with N being A$_1$ or B$_1$, sameMotion and isPrunedN are both set equal to TRUE:
        hMvpIdx is less than or equal to 2.
        The candidate HmvpCandList[NumHmvpCand −hMvpIdx] is equal to the merging candidate N, having the same motion vectors, the same reference indices, the same bi-prediction weight indices and the same half sample interpolation filter indices.
        isPrunedN is equal to FALSE.
    Otherwise, sameMotion is set equal to FALSE.
2. When sameMotion is equal to FALSE, the candidate HmvpCandList[NumHmvpCand −hMvpIdx] is added to the merging candidate list as follows:

mergeCandList[numCurrMergeCand++]=HmvpCandList[NumHmvpCand −hMvpIdx] (8-381)

8.5.2.16 Updating Process for the History-Based Motion Vector Predictor Candidate List Inputs to this process are:
luma motion vectors in 1/16 fractional-sample accuracy mvL0 and mvL1,
reference indices refIdxL0 and refIdxL1,
prediction list utilization flags predFlagL0 and predFlagL1,
bi-prediction weight index bcwIdx,
half sample interpolation filter index hpelIfIdx.

The MVP candidate hMvpCand consists of the luma motion vectors mvL0 and mvL1, the reference indices refIdxL0 and refIdxL1, the prediction list utilization flags predFlagL0 and predFlagL1, the bi-prediction weight index bcwIdx and the half sample interpolation filter index hpelIfIdx.

The candidate list HmvpCandList is modified using the candidate hMvpCand by the following ordered operations:

1. The variable identicalCandExist is set equal to FALSE and the variable removeIdx is set equal to 0.
2. When NumHmvpCand is greater than 0, for each index hMvpIdx with hMvpIdx=0 . . . NumHmvpCand −1, the following operations apply until identicalCandExist is equal to TRUE:
    When hMvpCand is equal to HmvpCandList [hMvpIdx], having the same motion vectors, the same reference indices, the same bi-prediction weight indices and the same half sample interpolation filter indices, identicalCandExist is set equal to TRUE and removeIdx is set equal to hMvpIdx.
3. The candidate list HmvpCandList is updated as follows:
    If identicalCandExist is equal to TRUE or NumHmvpCand is equal to 5, the following applies:
        For each index i with i=(removeIdx+1) . . . (NumHmvpCand −1), HmvpCandList[i−1] is set equal to HmvpCandList[i].
        HmvpCandList[NumHmvpCand−1] is set equal to hMvpCand.
    Otherwise (identicalCandExist is equal to FALSE and NumHmvpCand is less than 5), the following applies:
        HmvpCandList[NumHmvpCand++] is set equal to hMvpCand.

Another example of detail embodiment of processing HMVP merge candidates (on top of the VVC working draft) is descripted below, underlined part is added:

8.5.2 Derivation Process for Motion Vector Components and Reference Indices 8.5.2.1 General Inputs to this process are:
a luma location (xCb, yCb) of the top-left sample of the current luma coding block relative to the top-left luma sample of the current picture,
a variable cbWidth specifying the width of the current coding block in luma samples,
a variable cbHeight specifying the height of the current coding block in luma samples.

Outputs of this process are:
the luma motion vectors in 1/16 fractional-sample accuracy mvL0[0][0] and mvL1[0][0],
the reference indices refIdxL0 and refIdxL1,
the prediction list utilization flags predFlagL0[0][0] and predFlagL1[0][0],
the half sample interpolation filter index hpelIfIdx,
the bi-prediction weight index bcwIdx.

Let the variable LX be RefPicList[X], with X being 0 or 1, of the current picture.

For the derivation of the variables mvL0[0][0] and mvL1[0][0], refIdxL0 and refIdxL1, as well as predFlagL0[0][0] and predFlagL1[0][0], the following applies:

If general_merge_flag[xCb][yCb] is equal to 1, the derivation process for luma motion vectors for merge mode as specified in clause 8.5.2.2 is invoked with the luma location (xCb, yCb), the variables cbWidth and cbHeight inputs, and the output being the luma motion vectors mvL0[0][0], mvL1[0][0], the reference indices refIdxL0, refIdxL1, the prediction list utilization flags predFlagL0[0][0] and predFlagL1[0][0], the half sample interpolation filter index hpelIfIdx, the bi-prediction weight index bcwIdx and the merging candidate list mergeCandList.

Otherwise, the following applies:
For X being replaced by either 0 or 1 in the variables predFlagLX[0][0], mvLX[0][0] and refIdxLX, in PRED_LX, and in the syntax elements ref_idx_1X and MvdLX, the following ordered operations apply:
5. The variables refIdxLX and predFlagLX[0][0] are derived as follows:
   If inter_pred_idc[xCb][yCb] is equal to PRED_LX or PRED_BI, $refIdxLX = ref\_idx\_1X[xCb][yCb]$ (8-292)

$predFlagLX[0][0]=1$ (8-293)

Otherwise, the variables refIdxLX and predFlagLX[0][0] are specified by:

$refIdxLX=-1$ (8-294)

$predFlagLX[0][0]=0$ (8-295)

6. The variable mvdLX is derived as follows:

$mvdLX[0]=MvdLX[xCb][yCb][0]$ (8-296)

$mvdLX[1]=MvdLX[xCb][yCb][1]$ (8-297)

7. When predFlagLX[0][0] is equal to 1, the derivation process for luma motion vector prediction in clause 8.5.2.8 is invoked with the luma coding block location (xCb, yCb), the coding block width cbWidth, the coding block height cbHeight and the variable refIdxLX as inputs, and the output being mvpLX.

8. When predFlagLX[0][0] is equal to 1, the luma motion vector mvLX[0][0] is derived as follows:

$uLX[0]=(mvpLX[0]+mvdLX[0]+2^{18})\% 2^{18}$ (8-298)

$mvLX[0][0][0]=(uLX[0]>=2^{17})?(uLX[0]-2^{18}): uLX[0]$ (8-299)

$uLX[1]=(mvpLX[1]+mvdLX[1]+2^{18})\% 2^{18}$ (8-300)

$mvLX[0][0][1]=(uLX[1]>=2^{17})?(uLX[1]-2^{18}): uLX[1]$ (8-301)

NOTE 1—The resulting values of mvLX[0][0][0] and mvLX[0][0][1] as specified above will always be in the range of $-2^{17}$ to $2^{17}-1$, inclusive.

The half sample interpolation filter index hpelIfIdx is derived as follows:

$hpelIfIdx=AmvrShift==3?1:0$ (8-302)

The bi-prediction weight index bcwIdx is set equal to bcw_idx[xCb][yCb].

When all of the following conditions are true, refIdxL1 is set equal to −1, predFlagL1 is set equal to 0, and bcwIdx is set equal to 0:
predFlagL0[0][0] is equal to 1.
predFlagL1[0][0] is equal to 1.
The value of (cbWidth+cbHeight) is equal to 12.
The updating process for the history-based motion vector predictor list as specified in clause 8.5.2.16 is invoked with luma motion vectors mvL0[0][0] and mvL1[0][0], reference indices refIdxL0 and refIdxL1, prediction list utilization flags predFlagL0[0][0] and predFlagL1[0][0], bi-prediction weight index bcwIdx, and half sample interpolation filter index hpelIfIdx.

8.5.2.6 Derivation Process for History-Based Merging Candidates
Inputs to this process are:
a merge candidate list mergeCandList,
the number of available merging candidates in the list numCurrMergeCand.
Outputs to this process are:
the modified merging candidate list mergeCandList,
the modified number of merging candidates in the list numCurrMergeCand.

The variables isPrunedA$_1$ and isPrunedB$_1$ are both set equal to FALSE.

For each candidate in HmvpCandList[hMvpIdx] with index hMvpIdx=1 . . . NumHmvpCand, the following ordered operations are repeated until numCurrMergeCand is equal to MaxNumMergeCand −1:
3. The variable sameMotion is derived as follows:
   If all of the following conditions are true for any merging candidate N with N being A$_1$ or B$_1$, sameMotion and isPrunedN are both set equal to TRUE:
   hMvpIdx is less than or equal to 2.
   The candidate HmvpCandList[NumHmvpCand−hMvpIdx] and the merging candidate N have the same motion vectors and the same reference indices.
   isPrunedN is equal to FALSE.
   Otherwise, sameMotion is set equal to FALSE.
4. When sameMotion is equal to FALSE, the candidate HmvpCandList[NumHmvpCand−hMvpIdx] is added to the merging candidate list as follows:

mergeCandList[numCurrMergeCand++]=HmvpCandList[NumHmvpCand −hMvpIdx] (8-381)

8.5.2.16 Updating Process for the History-Based Motion Vector Predictor Candidate List
Inputs to this process are:
luma motion vectors in 1/16 fractional-sample accuracy mvL0 and mvL1,
reference indices refIdxL0 and refIdxL1,
prediction list utilization flags predFlagL0 and predFlagL1,
bi-prediction weight index bcwIdx,
half sample interpolation filter index hpelIfIdx.

The MVP candidate hMvpCand consists of the luma motion vectors mvL0 and mvL1, the reference indices refIdxL0 and refIdxL1, the prediction list utilization flags predFlagL0 and predFlagL1, the bi-prediction weight index bcwIdx and the half sample interpolation filter index hpelIfIdx.

The candidate list HmvpCandList is modified using the candidate hMvpCand by the following ordered operations:
4. The variable identicalCandExist is set equal to FALSE and the variable removeIdx is set equal to 0.
5. When NumHmvpCand is greater than 0, for each index hMvpIdx with hMvpIdx=0 . . . NumHmvpCand −1, the following operations apply until identicalCandExist is equal to TRUE:
   When hMvpCand and HmvpCandList[hMvpIdx] have the same motion vectors and the same reference indices, identicalCandExist is set equal to TRUE and removeIdx is set equal to hMvpIdx.
6. The candidate list HmvpCandList is updated as follows:

If identicalCandExist is equal to TRUE or NumHmvp-Cand is equal to 5, the following applies:
For each index i with i=(removeIdx+1) . . . (NumHmvpCand −1), HmvpCandList[i−1] is set equal to HmvpCandList[i].
HmvpCandList[NumHmvpCand −1] is set equal to hMvpCand.
Otherwise (identicalCandExist is equal to FALSE and NumHmvpCand is less than 5), the following applies:
HmvpCandList[NumHmvpCand++] is set equal to hMvpCand.

The embodiments and exemplary embodiments referred to their respective methods, and have corresponding apparatuses.

According to an embodiment of the present disclosure, an apparatus is provided for determining motion information for a current block, comprising: a memory and a processor coupled to the memory; and the processor is configured to execute the method according to any one of the previous aspects of the present disclosure.

Figure 12:
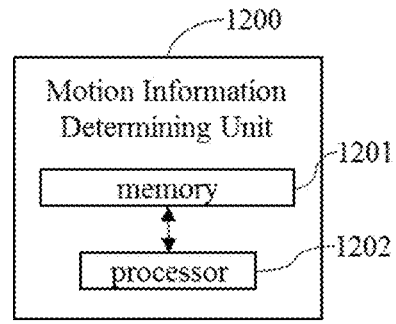
FIG. 12 is a block diagram of the motion information determining unit, including memory and processor.

FIG. 12 shows a schematic of Motion Information Determining Unit 1200 which comprises a memory 1201 and a processor 1202, respectively.

According to an embodiment of the present disclosure, an apparatus is provided for determining motion information for a current block of a frame based on a history-based motion vector predictor, HMVP, list, comprising: a HMVP list constructing unit configured to construct the HMVP list, which is an ordered list of N history-based candidates $H_k$, k=0, . . . , N−1, associated with motion information of N preceding blocks of the frame preceding the current block, wherein N is greater than or equal to 1, wherein each history-based candidate comprises motion information including elements: i) one or more motion vectors, MVs, ii) one or more reference picture indices corresponding to the MVs, and iii) one or more bi-prediction weight indices; a HMVP adding unit configured to add one or more history-based candidates from the HMVP list into a motion information candidate list for the current block; and a motion information deriving unit configured to derive the motion information based on the motion information candidate list.

Figure 13:
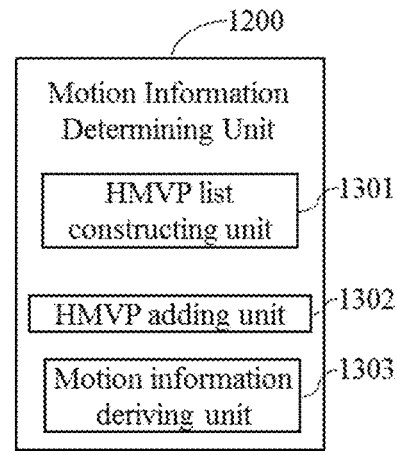
FIG. 13 is a block diagram of the motion information determining unit, including HMVP list constructing unit, HMVP adding unit, and Motion information deriving unit.

FIG. 13 shows a schematic of the Motion Information Determining Unit 1200 which comprises further HMVP list constructing unit 1301, HMVP adding unit 1302, and Motion information deriving unit 1303.

According to an embodiment of the present disclosure, an apparatus is provided for constructing and updating a history-based motion vector predictor, HMVP, list, comprising: a HMVP list constructing unit configured to construct the HMVP list, which is an ordered list of N history-based candidates $H_k$, k=0, . . . , N−1, associated with motion information of N preceding blocks of the frame preceding the current block, wherein N is greater than or equal to 1, wherein each history-based candidate comprises motion information including elements: i) one or more motion vectors, MVs, ii) one or more reference picture indices corresponding to the MVs, and iii) one or more bi-prediction weight indices; a motion information comparing unit configured to compare at least one of the elements of each history-based candidate of the HMVP list with the corresponding element of the current block; and a motion information adding unit configured to add the motion information of the current block to the HMVP list, if as a result of the comparing at least one of the elements of each of the history-based candidate of the HMVP list differs from the corresponding element of the current block.

Figure 14:
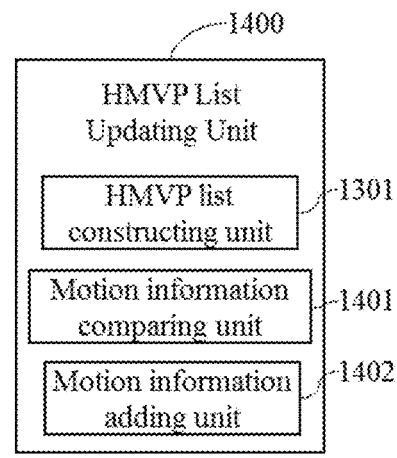
FIG. 14 is a block diagram of the HMVP List Updating Unit, including HMVP list constructing unit, Motion information comparing unit, and Motion information adding unit.

FIG. 14 shows a schematic of HMVP List Updating Unit 1400 which comprises the HMVP list constructing unit 1301, Motion information comparing unit 1401, and Motion information adding unit 1402.

According to an embodiment of the present disclosure, a computer program product is provided comprising a program code for performing the method according to any one of the previous aspects of the present disclosure.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Summarizing, the present disclosure relates to video encoding and decoding, and in particular to determining motion information for a current block using a history-based motion vector predictor, HMVP, list. The HMVP list is constructed, with said list being an ordered list of N HMVP candidates $H_k$, k=0, ..., N-1, which are associated with motion information of N preceding blocks of the frame and precede the current block. Each HMVP candidate has motion information including elements of one or more motion vectors, MVs, one or more reference picture indices corresponding to the MVs, and one or more bi-prediction weight indices. One or more HMVP candidates from the HMVP list are added into a motion information candidate list for the current block; and the motion information is derived based on the motion information candidate list. The HMVP is further updated by comparing at least one of the elements of each history-based candidate of the HMVP list with the corresponding element of the current block. When the at least one of the HMVP elements differs from the corresponding element of the current block, the motion information of the current block is added to the HMVP list.

Additional embodiments are summarized in the following clauses:

Clause 1: A method of deriving bi-prediction weight index, comprising:
constructing history-based motion information list (HMVL) which is an ordered list of N motion records $H_k$, k=0, ..., N-1, associated with N preceding blocks of a frame, wherein N is greater or equal 1, wherein each motion record comprises one or more motion vectors, one or more reference picture indices corresponding to the motion vectors and one or more bi-prediction weight indices if the motion record comprises more motion vectors; and
constructing a history-based motion information candidate for a current block based on the history-based motion information list.

Clause 2: The method of clause 1, where in the constructing a history-based motion information candidate for a current block based on the history-based motion information list comprising:
setting, for a candidate in the history-based motion information candidate that corresponds to the history-based motion information list record $H_k$, bi-prediction weight index as the weight index of the record $H_k$.

Clause 3: The method of clause 1, wherein the motion records in the history-based motion information list are ordered in an order in which the motion records of said preceding blocks are obtained from a bit stream.

Clause 4: The method of clause 1, wherein the history-based motion information list has a length of N, and the N is 6 or 5.

Clause 5: The method of clause 1, wherein constructing history-based motion information list (HMVL) comprising:

checking, prior to adding motion information of the current block to HMVL, whether each element of HMVL differs from the motion information of current block; and
adding motion information of current block to HMVL only if each element of HMVL differs from the motion information of current block.

Clause 6: The method of clause 5, wherein checking whether each element of HMVL differs from the motion information of current block comprising:
comparing of corresponding motion vectors, and
comparing of corresponding reference picture indices.

Clause 7: The method of clause 5, wherein checking whether each element of HMVL differs from the motion information of current block comprising:
comparing of corresponding motion vectors,
comparing of corresponding reference picture indices, and
comparing of bi-prediction weight indices.

Clause 8: The method of any one of clauses 1-7, wherein constructing the candidate motion information set for a current block comprising:
deriving motion information from the motion information of a first block, wherein the first block has preset spatial or temporal position relationship with the current block.

Clause 9: The method of any one of clauses 1-7, wherein constructing the candidate motion information set for a current block comprising:
deriving motion information from the motion information of a second block, wherein the second block is reconstructed before the current block.

Clause 10: The method of any one of clauses 1-9, wherein constructing a history-based motion information candidate for a current block based on the history-based motion information list comprising:
checking, whether constructed history-based motion information candidate (history-based motion information list record $H_k$) differs from the some (predefined) subset of the elements from candidate motion information list;
using history-based motion information candidate (history-based motion information list record $H_k$) only if it differs from the some (predefined) subset of the elements from candidate motion information list.

Clause 11: The method of clause 10, wherein checking, whether constructed history-based motion information candidate (history-based motion information list record $H_k$) differs from the some (predefined) subset of the elements from candidate motion information list comprise:
comparing of corresponding motion vectors, and
comparing of corresponding reference picture indices.

Clause 12: The method of clause 10, wherein checking, whether constructed history-based motion information candidate (history-based motion information list record $H_k$) differs from the some (predefined) subset of the elements from candidate motion information list comprise:
comparing of corresponding motion vectors,
comparing of corresponding reference picture indices, and
comparing of bi-prediction weight indices.

Clause 13: The method of any of clauses 10-12, wherein candidate motion information list is a merge candidate list.

Clause 14: The method of any one of clauses 1-13, in particular to any of claims 1 to 9, wherein the history-based motion information candidate set is a subset of a candidate motion information list of the current block when the current block is in a merge mode, or a subset of a candidate prediction motion information list of the current block when the current block is in a AMVP mode.

Clause 15: A method of deriving motion information for the current block, comprising:
constructing motion information list comprising:
obtaining motion information of a first and second blocks, wherein the first and the second blocks have preset spatial or temporal position relationship with the current block;
adding motion information of the first block to the motion information list;
checking, prior to adding motion information of the second block to the motion information list, whether bi-prediction weight index of the first block is equal to the bi-prediction weight index of the second block;
adding motion information of the second block to the motion information list, only if bi-prediction weight index of the first block is not equal to the bi-prediction weight index of the second block;
obtaining motion information candidate index from the bitstream;
deriving motion information for the current block based on constructed motion information candidate and obtained motion information candidate index.

Clause 16: A method of clause 15, wherein motion information list is merge candidate list.

Clause 17: A method of clauses 15-16, wherein motion information comprises at least one of:
one of more motion vectors;
one or more reference indices; or
bi-prediction weight index.

Clause 18: A method of clauses 15-16, wherein motion information comprises at least one of:
one of more motion vectors;
one or more reference indices;
bi-prediction weight index; or
interpolation filter index.

Clause 19: An apparatus of constructing a candidate motion information set, comprising:
a memory and a processor coupled to the memory; and
the processor is configured to execute the method of any one of claims 1-18, in particular to any of claims 1 to 9 and 14.

LIST OF REFERENCE SIGNS

FIG. 1A
10 video coding system
12 source device
13 communication channel
14 destination device
16 picture source
17 picture data
18 pre-processor
19 pre-processed picture data
20 video encoder
21 encoded picture data
22 communication interface
28 communication interface
30 video decoder
31 decoded picture data
32 post processor
33 post-processed picture data
34 display device FIG. 1B
40 video coding system
41 imaging device(s)
42 antenna
43 processor(s)
44 memory store(s)
45 display device
46 processing circuitry
20 video encoder
30 video decoder FIG. 2
17 picture (data)
19 pre-processed picture (data)
20 encoder
21 encoded picture data
201 input (interface)
204 residual calculation [unit or operation]
206 transform processing unit
208 quantization unit
210 inverse quantization unit
212 inverse transform processing unit
214 reconstruction unit
220 loop filter unit
230 decoded picture buffer (DPB)
260 mode selection unit
270 entropy encoding unit
272 output (interface)
244 inter prediction unit
254 intra prediction unit
262 partitioning unit
203 picture block
205 residual block
213 reconstructed residual block
215 reconstructed block
221 filtered block
231 decoded picture
265 prediction block
266 syntax elements
207 transform coefficients
209 quantized coefficients
211 dequantized coefficients FIG. 3
21 encoded picture data
30 video decoder
304 entropy decoding unit
309 quantized coefficients
310 inverse quantization unit
311 dequantized coefficients
312 inverse transform processing unit
313 reconstructed residual block
314 reconstruction unit
315 reconstructed block
320 loop filter
321 filtered block
330 decoded picture buffer DBP
331 decoded picture
360 mode application unit
365 prediction block
366 syntax elements
344 inter prediction unit
354 intra prediction unit FIG. 4
400 video coding device
410 ingress ports/input ports
420 receiver units Rx
430 processor
440 transmitter units Tx 450 egress ports/output ports
460 memory
470 coding module
FIG. 5
500 source device or destination device
502 processor
504 memory
506 code and data
508 operating system
510 application programs
512 bus
518 display
FIG. 10
1000 flowchart of motion information determining method
FIG. 11
1100 flowchart of HMVP list updating method
FIG. 12
1200 motion information determining unit
1201 memory
1202 processor
FIG. 13
1200 motion information determining unit
1301 HMVP list constructing unit
1302 HMVP adding unit
1303 motion information deriving unit
FIG. 14
1400 HMVP list updating unit
1301 HMVP list constructing unit
1401 motion information comparing unit
1402 motion information adding unit Definitions of Acronyms and Glossaries HEVC High Efficiency Video Coding
CTU Coding tree unit
LCU Largest coding unit
CU Coding unit
MV Motion vector
MVP Motion vector prediction
MVCL Motion vector candidates list
HMVL History-based motion vector list
HMVP History-based motion vector prediction
AMVP Advanced motion vector prediction
LUT Lookup table
FIFO First-In-First-Out
TMVP Temporal motion vector prediction
GBi Generalized bi-prediction
RDO Rate-distortion optimization
BCW Bi-prediction weight index

The invention claimed is:

1. A video decoding apparatus for decoding a current block of a frame based on a history-based motion vector predictor (HMVP) list, comprising:
one or more processors; and
a memory coupled to the one or more processors, wherein the memory comprises instructions, that when executed by the one or more processors, cause the video decoding apparatus to perform following operations of:
constructing the HMVP list, which is an ordered list of N history-based candidates Hk, k=0, . . . , N−1, associated with motion information of N preceding blocks of the frame preceding the current block, wherein N is greater than or equal to 1, wherein each history-based candidate comprises motion information including elements:
i) one or more motion vectors (MVs),
ii) one or more reference picture indices corresponding to the MVs, and
iii) one or more bi-prediction weight indices;
adding one or more history-based candidates from the HMVP list into a motion information candidate list for the current block;
deriving motion information for the current block based on the motion information candidate list; and
decoding the current block based on the motion information for the current block;
comparing at least one of the elements of each history-based candidate of the HMVP list with a corresponding element of the motion information for the current block; and
adding the motion information of the current block to the HMVP list, if as a result of the comparing at least one of the elements of each HMVP candidate of the HMVP list differs from the corresponding element of the motion information of the current block;
wherein the comparison is performed only on checking differences with respect to the MVs and the reference picture indices of the history-based candidate of the HMVP list and corresponding MVs and reference picture indices of the motion information for the current block, irrespective of whether or not the other elements are the same.

2. The video decoding apparatus of claim 1, wherein the history-based candidates of the HMVP list are ordered in an order in which history-based candidates of preceding blocks are obtained from a bitstream.

3. The video decoding apparatus of claim 1, wherein the motion information candidate list includes:
a first motion information from motion information of a first block, wherein the first block has a preset spatial or temporal position relationship with the current block.

4. A video encoding apparatus for encoding a current block of a frame based on a history-based motion vector predictor (HMVP) list, comprising:
one or more processors; and
a memory coupled to the one or more processors, wherein the memory comprises instructions, that when executed by the one or more processors, cause the video encoding apparatus to perform following operations of:
constructing the HMVP list, which is an ordered list of N history-based candidates Hk, k=0, . . . , N−1, associated with motion information of N preceding blocks of the frame preceding the current block, wherein N is greater than or equal to 1, wherein each history-based candidate comprises motion information including elements:
i) one or more motion vectors (MVs),
ii) one or more reference picture indices corresponding to the MVs, and
iii) one or more bi-prediction weight indices;
adding one or more history-based candidates from the HMVP list into a motion information candidate list for the current block;
deriving motion information for the current block based on the motion information candidate list; and
encoding the current block based on the motion information for the current block;
comparing at least one of the elements of each history-based candidate of the HMVP list with a corresponding element of the motion information for the current block; and
adding the motion information of the current block to the HMVP list, if as a result of the comparing at least one of the elements of each HMVP candidate of the HMVP list differs from the corresponding element of the motion information of the current block;

wherein the comparison is performed only on checking differences with respect to the MVs and the reference picture indices of the history-based candidate of the HMVP list and corresponding MVs and reference picture indices of the motion information for the current block, irrespective of whether or not the other elements are the same.

5. The video encoding apparatus of claim 4, wherein the motion information candidate list includes:

a first motion information from motion information of a first block, wherein the first block has a preset spatial or temporal position relationship with the current block.

6. A video decoding method for decoding a current block of a frame based on a history-based motion vector predictor (HMVP) list, comprising:

constructing the HMVP list, which is an ordered list of N history-based candidates Hk, k=0, ..., N−1, associated with motion information of N preceding blocks of the frame preceding the current block, wherein N is greater than or equal to 1, wherein each history-based candidate comprises motion information including elements:
 i) one or more motion vectors (MVs),
 ii) one or more reference picture indices corresponding to the MVs, and
 iii) one or more bi-prediction weight indices;

adding one or more history-based candidates from the HMVP list into a motion information candidate list for the current block;

deriving motion information for the current block based on the motion information candidate list; and decoding the current block based on the motion information for the current block;

comparing at least one of the elements of each history-based candidate of the HMVP list with a corresponding element of the motion information for the current block; and adding the motion information of the current block to the HMVP list, if as a result of the comparing at least one of the elements of each HMVP candidate of the HMVP list differs from the corresponding element of the motion information of the current block;

wherein the comparison is performed only on checking differences with respect to the MVs and the reference picture indices of the history-based candidate of the HMVP list and corresponding MVs and reference picture indices of the motion information for the current block, irrespective of whether or not the other elements are the same.

7. The video decoding method of claim 6, wherein the history-based candidates of the HMVP list are ordered in an order in which history-based candidates of preceding blocks are obtained from a bitstream.

8. The video decoding method of claim 6, wherein the motion information candidate list includes:

a first motion information from motion information of a first block, wherein the first block has a preset spatial or temporal position relationship with the current block.

* * * * *